(12) United States Patent
Murphy et al.

(10) Patent No.: US 10,859,168 B2
(45) Date of Patent: Dec. 8, 2020

(54) BIASING MEMBERS FOR VALVE ASSEMBLY

(71) Applicant: Advanced Valve Technologies, LLC, Houston, TX (US)

(72) Inventors: Kevin P. Murphy, Elk Grove Village, IL (US); Michael S. Murphy, Elk Grove Village, IL (US); Colin P. Murphy, Elk Grove Village, IL (US)

(73) Assignee: ADVANCED VALVE TECHNOLOGY, LLC, Houston, TX (US)

( * ) Notice: Subject to any disclaimer, the term of this patent is extended or adjusted under 35 U.S.C. 154(b) by 0 days.

(21) Appl. No.: 15/794,959

(22) Filed: Oct. 26, 2017

(65) Prior Publication Data

US 2018/0119823 A1 May 3, 2018

Related U.S. Application Data

(60) Provisional application No. 62/414,427, filed on Oct. 28, 2016.

(51) Int. Cl.
*F16K 3/20* (2006.01)
*F16K 3/18* (2006.01)
(Continued)

(52) U.S. Cl.
CPC .............. *F16K 3/20* (2013.01); *F16K 3/0281* (2013.01); *F16K 3/18* (2013.01); *F16K 3/312* (2013.01);
(Continued)

(58) Field of Classification Search
CPC ......... Y10T 137/0458; Y10T 137/0514; Y10T 137/6069; Y10T 137/6072; F16K 3/20;
(Continued)

(56) References Cited

U.S. PATENT DOCUMENTS 515,976 A * 3/1894 Smith ..................... F16L 41/06
137/15.14
587,092 A 7/1897 French
(Continued)

FOREIGN PATENT DOCUMENTS

CA 2254656 8/1999
DE 3414874 A1 11/1984
(Continued)

OTHER PUBLICATIONS

International Search Report and Written Opinion in PCT/US2017/058708 dated Feb. 12, 2018 (15 pages).
(Continued)

*Primary Examiner* — Jessica Cahill
(74) *Attorney, Agent, or Firm* — Duane Morris LLP

(57) ABSTRACT

A valve assembly may include a valve having an upper valve surface and a lower valve surface. The valve may be movable in a slot in a housing between an open position and a closed position, and the slot may have an upper slot surface and a lower slot surface. The valve assembly may include a biasing member movably positioned within the housing that may be configured to urge the valve toward one of the upper slot surface and the lower slot surface.

20 Claims, 15 Drawing Sheets

(51) Int. Cl.
*F16K 3/312* (2006.01)
*F16L 41/06* (2006.01)
*F16L 55/105* (2006.01)
*F16K 3/02* (2006.01)
*F16K 31/50* (2006.01)

(52) U.S. Cl.
CPC ............ *F16K 31/508* (2013.01); *F16L 41/06* (2013.01); *F16L 55/105* (2013.01)

(58) Field of Classification Search
CPC .......... F16K 3/0281; F16K 3/18; F16K 3/312; F16K 31/508; F16L 41/06; F16L 55/105
USPC .................................................. 251/193, 326
See application file for complete search history.

(56) References Cited

U.S. PATENT DOCUMENTS

| | | | | |
|---|---|---|---|---|
| 3,032,069 | A | | 4/1958 | Ficklin |
| 3,388,864 | A | * | 6/1968 | Noakes ................. F25B 41/062 236/92 B |
| 3,650,547 | A | | 3/1972 | Tickett |
| 3,948,282 | A | * | 4/1976 | Yano ....................... F16L 41/04 137/15.17 |
| RE29,299 | E | * | 7/1977 | Estes ......................... F16K 3/36 137/246.22 |
| 4,177,827 | A | * | 12/1979 | Smith ...................... F16K 43/00 137/246.22 |
| 4,355,656 | A | * | 10/1982 | Smith ................... F16L 55/105 137/318 |
| 4,534,540 | A | * | 8/1985 | Bragin ...................... F16K 1/24 251/187 |
| 5,170,813 | A | | 12/1992 | Francis |
| 5,186,199 | A | * | 2/1993 | Murphy .................... F16K 7/20 137/15.08 |
| 5,238,219 | A | | 8/1993 | Noelke ................. F25B 41/062 251/122 |
| 5,820,106 | A | | 10/1998 | Wurangian |
| 6,131,597 | A | * | 10/2000 | Mendicino ............. B23D 21/00 137/15.14 |
| 6,142,166 | A | | 11/2000 | Kuzan |
| 6,283,446 | B1 | | 9/2001 | Sato |
| 6,308,726 | B2 | | 10/2001 | Sato |
| 6,357,471 | B1 | | 3/2002 | Sato |
| 6,416,263 | B1 | | 7/2002 | Sato |
| 6,470,907 | B1 | | 10/2002 | Sato |
| 6,530,389 | B2 | | 3/2003 | Sato |
| 6,615,859 | B2 | | 9/2003 | Sato |
| 6,622,747 | B2 | | 9/2003 | Sato |
| 6,776,184 | B1 | | 8/2004 | Maichel |
| 6,983,759 | B2 | * | 1/2006 | Maichel .................... F16K 3/12 137/315.29 |
| 7,044,149 | B2 | * | 5/2006 | Hallam .................. F16L 55/105 137/15.09 |
| 7,363,935 | B2 | | 4/2008 | Anderson |
| 8,627,843 | B2 | * | 1/2014 | Ries ....................... F16L 55/105 137/318 |
| 8,695,626 | B2 | * | 4/2014 | Murphy ................. F16L 55/105 137/315.31 |
| 9,212,775 | B2 | * | 12/2015 | Miller ...................... F16K 43/00 |
| 9,765,904 | B2 | * | 9/2017 | Mogi ..................... F25B 41/062 |
| 2004/0222399 | A1 | * | 11/2004 | Maichel .................... F16L 41/06 251/326 |
| 2006/0070659 | A1 | | 4/2006 | Nelson |
| 2009/0267012 | A1 | * | 10/2009 | Haberhauffe .......... F16K 3/0218 251/326 |
| 2012/0160337 | A1 | * | 6/2012 | Murphy ................. F16L 55/105 137/15.14 |

FOREIGN PATENT DOCUMENTS

| | | |
|---|---|---|
| DE | 69812316 T2 | 8/1999 |
| EP | 935089 A1 | 8/1999 |
| EP | 2466177 A1 | 6/2012 |
| FR | 1406873 A | 7/1965 |
| FR | 2283375 A1 | 3/1976 |

OTHER PUBLICATIONS

"Valve Insertion Made EZ" brochure printed Jun. 26, 2008, 2 pgs, U.S.

* cited by examiner

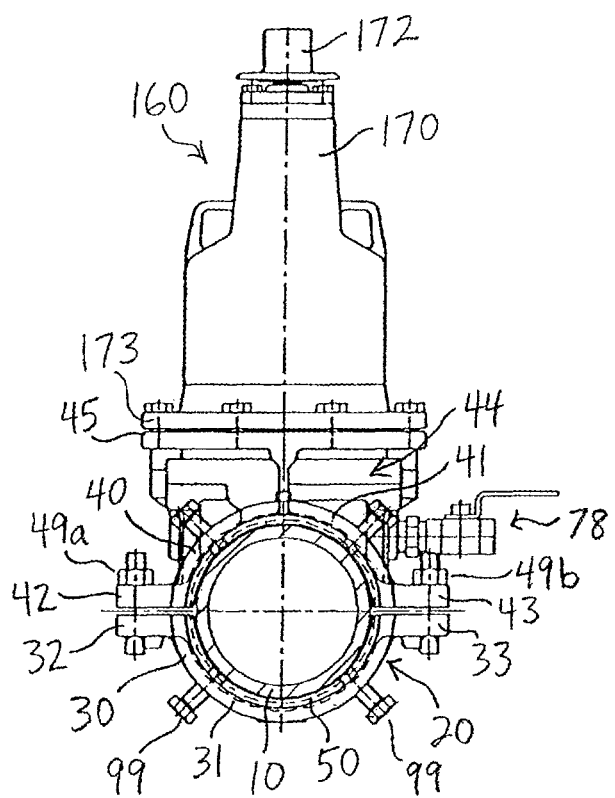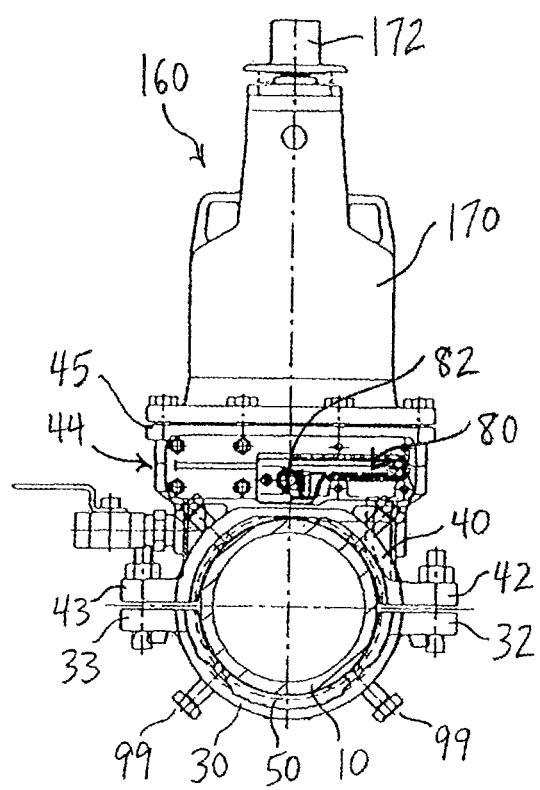
FIG. 1A
FIG. 1B

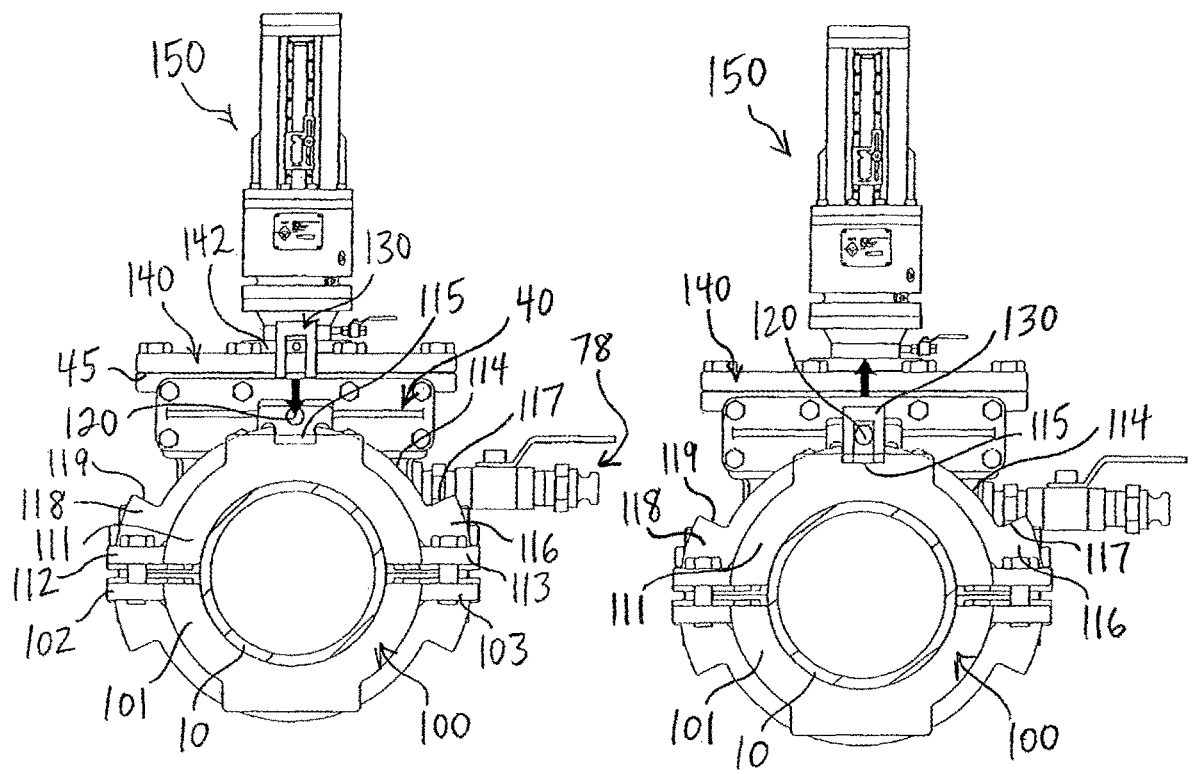
FIG. 6A
FIG. 6B
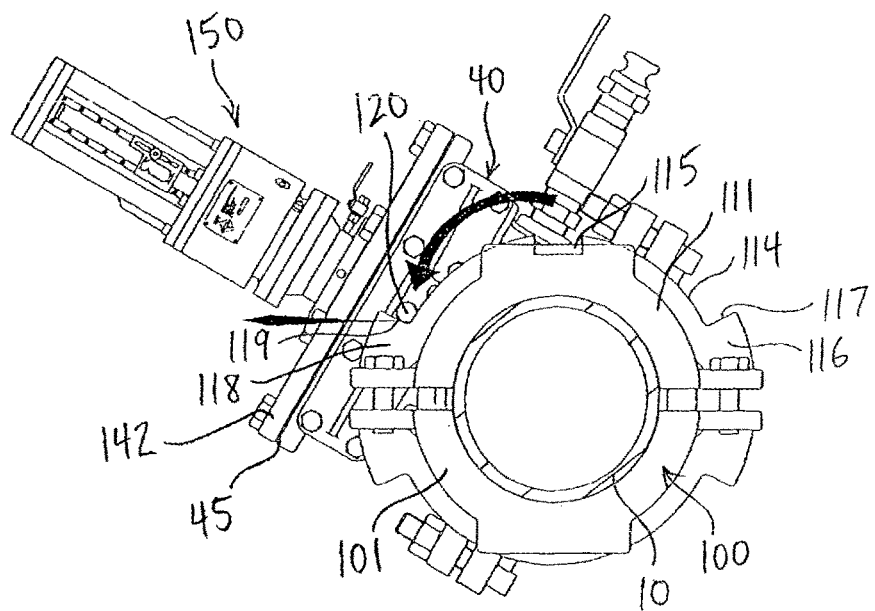
FIG. 6C

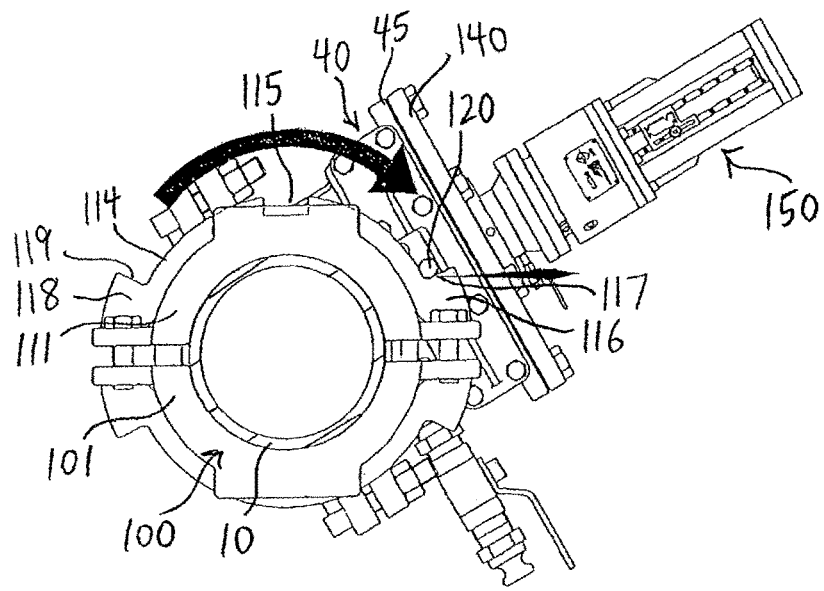
FIG. 6D
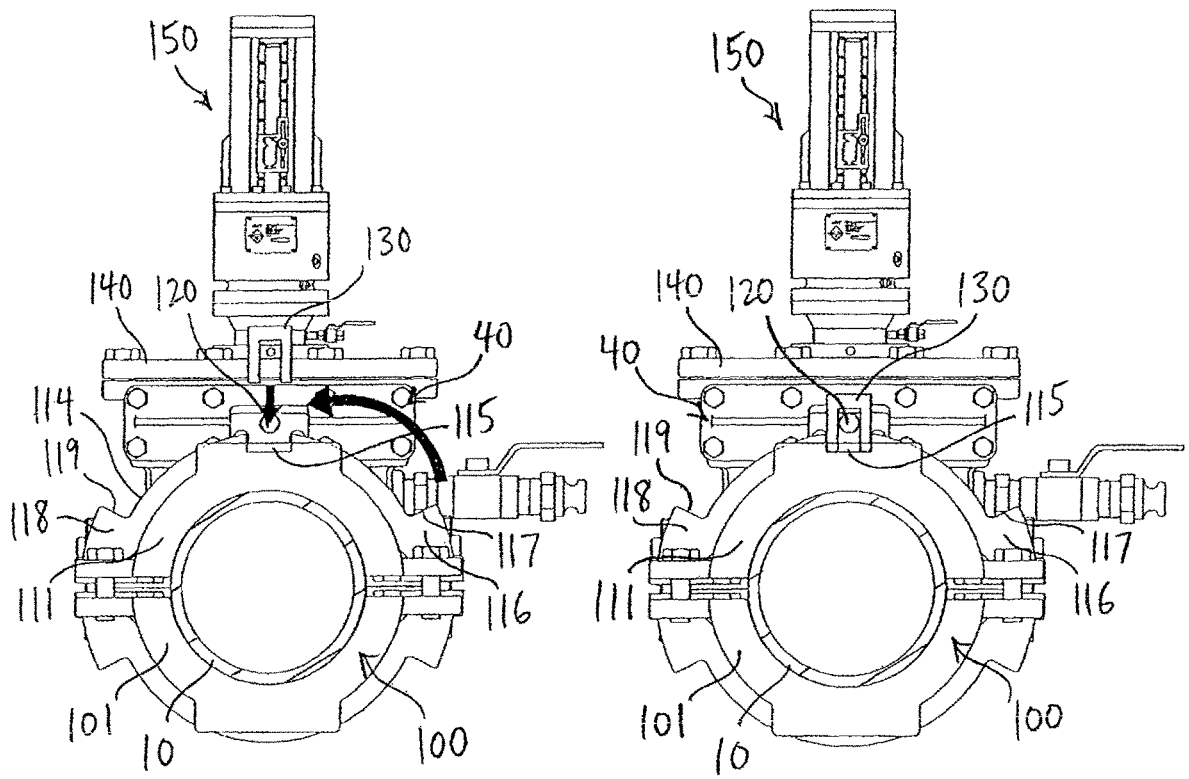
FIG. 6E
FIG. 6F

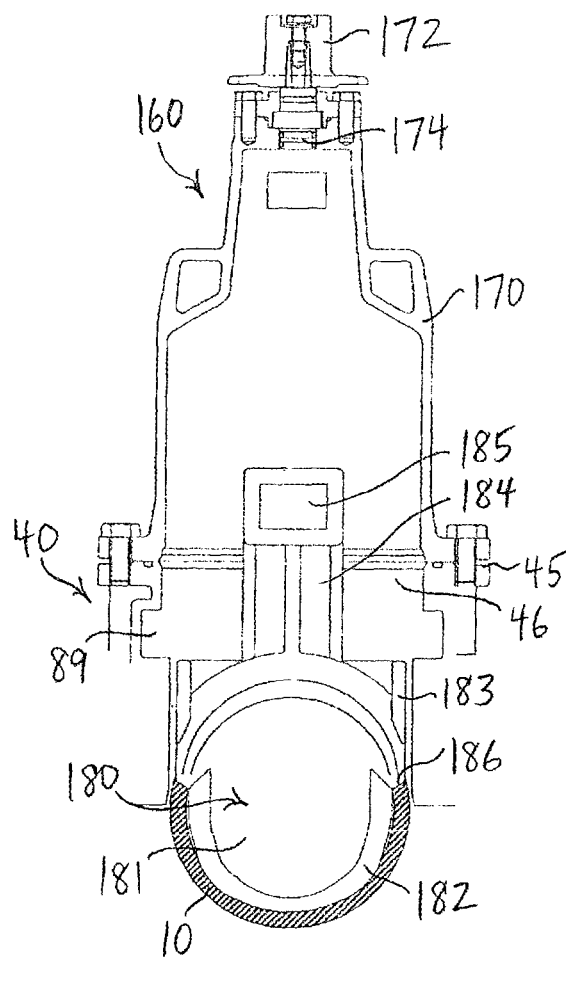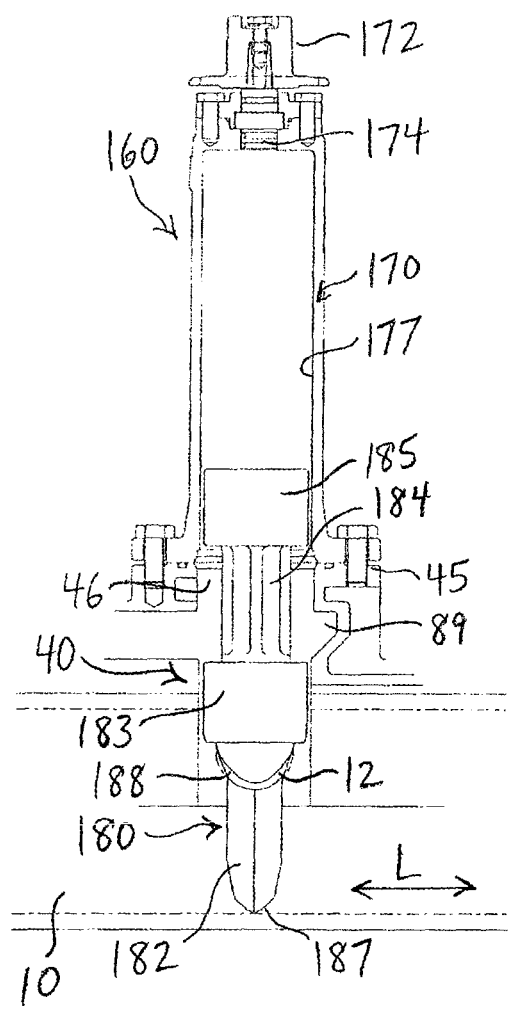
FIG. 8A
FIG. 8B

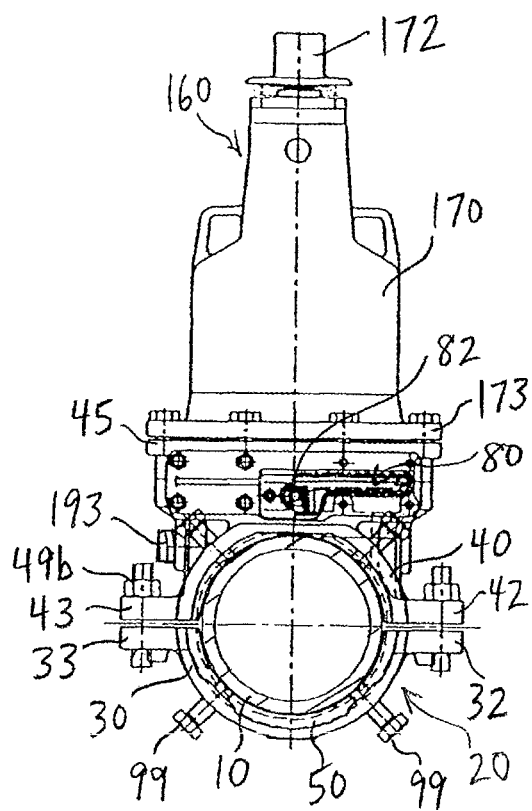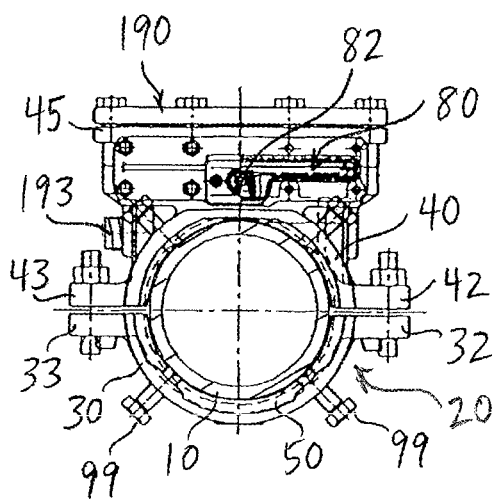
FIG. 9
FIG. 10

BIASING MEMBERS FOR VALVE ASSEMBLY

PRIORITY CLAIM

This invention claims the benefit of priority of U.S. Provisional Application Ser. No. 62/414,427, entitled "Biasing Members for Valve Assembly," filed Oct. 28, 2016, the disclosure of which is hereby incorporated by reference in its entirety.

BACKGROUND

The present embodiments relate generally to systems and methods for valve insertion and linestopping, in particular the prevention of escape of fluid from valves.

There are various instances in which it may become necessary or desirable to affect flow within an existing pipe, such as one that is subterraneously placed. Such pipes may carry gases, oil, water, or other fluids, and it may be desirable to temporarily or permanently stop the flow within the pipe.

Various valve insertion methods are known for inserting a valve in a line of an existing pipe. In general, a sealing housing having first and second portions may be coupled around an exterior surface of the existing pipe. A slit may be made into the existing pipe using a cutting machine without stopping passage of fluid. A gate, or sluice valve, is inserted into the slit portion of the existing pipe. The gate may be advanced to a position in which is inhibits flow through the existing pipe.

In various systems, a relatively large excavation is required in order to access the existing pipe and perform various operations. Moreover, the cutting machine generally either cuts an entire section of the pipe, or a section that is about 180 degrees along the upper surface of the pipe, prior to insertion of the gate. However, such large cuts to the pipe may adversely affect the integrity of the pipe.

Additionally, it may be difficult to attach a valve bonnet and a gate to the existing pipe after a cut is formed into the existing pipe. Still further, it also may be difficult or impossible to remove the valve bonnet and gate after a desired operation is performed. In some situations, a relatively expensive valve bonnet and gate therefore remain coupled to the existing pipe even in situations where it was only necessary to perform a relatively brief, single linestop.

In systems where it is possible to remove the valve bonnet or cutting tool, in particular systems installed on low-pressure pipes, it may be difficult to prevent the escape of fluid from within the pipe after the valve bonnet or cutting tool is removed.

SUMMARY

In one aspect, a valve assembly may include a valve having an upper valve surface and a lower valve surface. The valve may be movable in a slot in a housing between an open position and a closed position, and the slot may have an upper slot surface and a lower slot surface. The valve assembly may include a biasing member movably positioned within the housing that may be configured to urge the valve toward one of the upper slot surface and the lower slot surface. The biasing member may be configured to contact the lower valve surface or the upper valve surface. The biasing member may be configured to urge the valve through direct contact with the valve. The biasing member may have a conical, frustroconical, hemispherical, or other shaped tip. The biasing member may be moveably positioned within a bore extending through an outer surface of the housing. The bore may be oriented parallel to, obliquely to, or perpendicularly to the valve. The valve assembly may include a removable seal plug. The valve assembly may include a second biasing member. The biasing member may be positioned proximal a first corner of the valve, and the second biasing member may be positioned proximal a second corner of the valve. The biasing member may be positioned along a first edge of the valve, and the second biasing member may be positioned along a second edge of the valve. The valve may include means for moving the valve from the open position to the closed position.

In another aspect, a biasing system includes a valve having an upper valve surface and a lower valve surface, the valve being movable between an open position and a closed position in a slot in a housing. The slot may include an upper slot surface and a lower slot surface. The biasing system may include a plurality of biasing members, and each biasing member may be movably positioned in the housing. The plurality of biasing members may be configured to inhibit fluid flow around the valve by urging the valve toward one of the upper slot surface and the lower slot surface. The plurality of biasing members may be configured to exert a biasing force on the valve, such as when the valve is in the closed position. The biasing force may have an adjustable magnitude. The plurality of biasing members may be positioned around a perimeter of the valve.

In another aspect, a method for sealing a valve includes the step of attaching a component to a housing containing a valve that is moveable between an open position and a closed position. In the open position, the valve does not obstruct an opening. In the closed position, the valve obstructs the opening. The method may further include the steps of inserting the component through the opening when the valve is in the open position, retracting the component from the opening, moving the valve to the closed position, manipulating a plurality of biasing members to urge the valve toward the housing to facilitate inhibiting fluid flow through the opening, and removing the component from the housing. The component may be a gate, a cutting machine, or other component.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 1A-1B are front and rear views, respectively, of a sealing housing coupled to an existing pipe, and a valve bonnet coupled to the sealing housing, with selected components shown in cross-section for illustrative purposes.

FIGS. 6A-6F are rear views illustrating exemplary method steps in connection with performing a cutting operation, with selected components shown in cross-section for illustrative purposes.

FIGS. 8A-8B are cross-sectional and side-sectional views, respectively, illustrating a sealing housing coupled to an existing pipe, and a valve bonnet coupled to the sealing housing, with the gate in a closed position.

FIG. 9 is a rear view of a sealing housing coupled to an existing pipe, and a valve bonnet coupled to the sealing housing, with selected components shown in cross-section for illustrative purposes.

FIG. 10 is a rear view of a sealing housing coupled to an existing pipe, and a blind flange coupled to the sealing housing, with selected components shown in cross-section for illustrative purposes.

FIG. 12B is a detailed view of one exemplary biasing member.

DETAILED DESCRIPTION OF THE PREFERRED EMBODIMENTS

Figure 2:
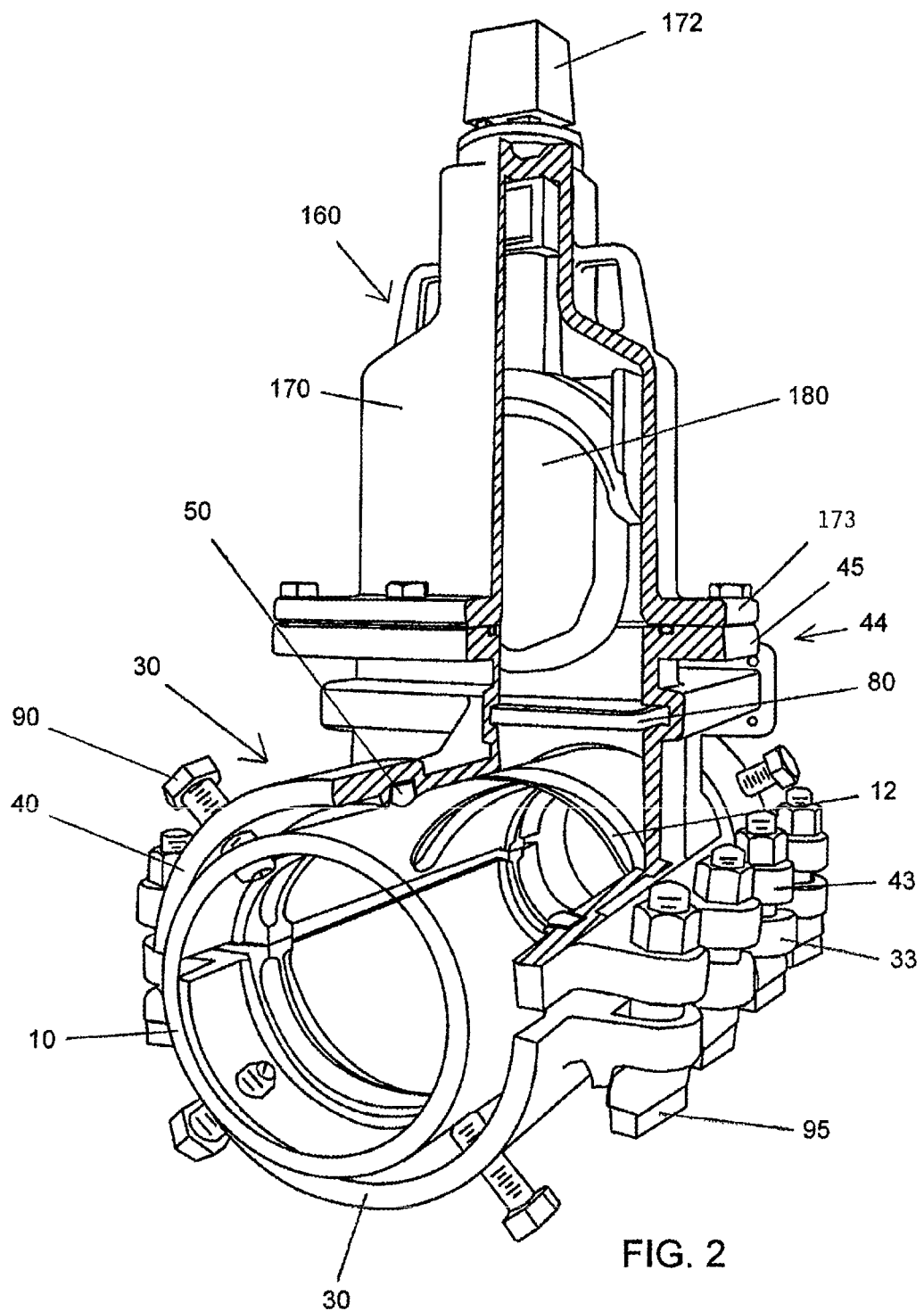
FIG. 2 is a partial cut-away view of the sealing assembly of FIG. 1 coupled to the existing pipe, and the valve bonnet coupled to the sealing housing.

Referring now to FIGS. 1A-1B, a first embodiment of a system for use with an existing pipe 10 is described. The system comprises a sealing housing 20, which includes a lower housing portion 30 and an upper housing portion 40. The lower and upper housing portions 30 and 40 each partially surround an exterior surface of the pipe 10, and are designed and dimensioned to enclose and seal up, in an airtight state, two portions of the existing pipe 10 along its axial length.

In FIG. 1A, a valve bonnet 170 is shown coupled to the upper housing portion 40. As will be explained further below, each of an adapter plate 140 for a cutting machine 150, the valve bonnet 170, and a blind flange 190 may be selectively coupled to an upper surface 45 of the upper housing portion 40, as needed, to perform various functions in connection with installation and operation of the system.

The lower housing portion 30 is generally disposed below the upper housing portion 40 when the lower and upper housing portions 30 and 40 are assembled as shown in FIGS. 1-2. While the terms "upper" and "lower" housing portions are used herein, the upper housing portion 40 does not need to be entirely vertically above the lower housing portion 30 in all applications.

The lower housing portion 30 comprises a main body 31 that is adapted to encircle a portion of the pipe 10, and has coupling regions 32 and 33 that may extend radially outward relative to the pipe 10, as shown in FIGS. 1A-1B. Similarly, the upper housing portion 40 comprises a main body 41 that is adapted to encircle a portion of the pipe 10, and coupling regions 42 and 43 that may extend radially outward relative to the pipe 10 and are designed to overlay the coupling regions 32 and 33, respectively, of the lower housing portion 30. The coupling regions 32, 33, 42 and 43 may comprise bores that are dimensioned to receive a securing member, such as a bolt forming part of nut and bolt assemblies 49a and 49b. When assembled, the nut and bolt assembly 49a secures the coupling region 32 of the lower housing portion 30 to the coupling region 42 of the upper housing portion 40, while the nut and bolt assembly 49b secures the coupling region 33 of the lower housing portion 30 to the coupling region 43 of the upper housing portion 40, thereby securing the lower and upper portions 30 and 40 of the sealing housing 20 circumferentially around the pipe 10. Optionally, sacrificial anodes 95 may be provided on the nut and bolt assemblies 49a and 49b as shown in FIG. 2.

Figure 3:
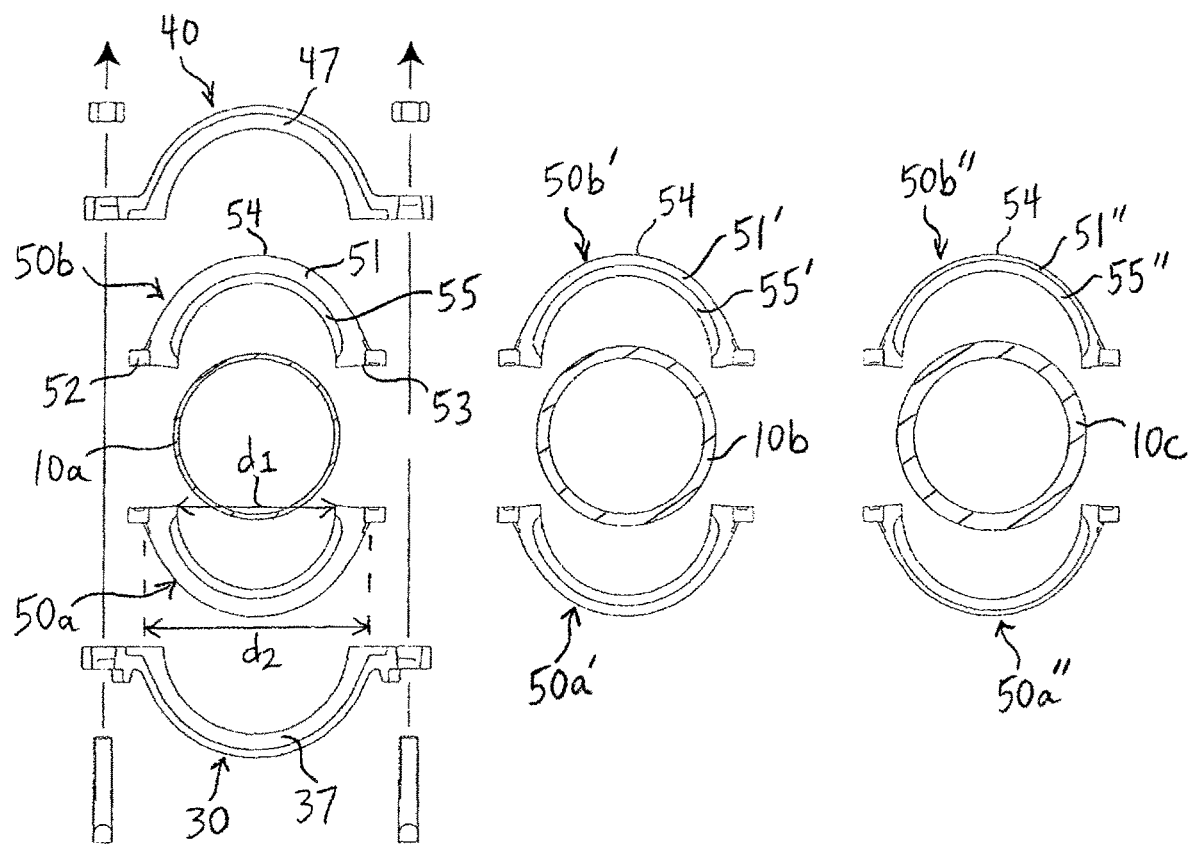
FIG. 3 illustrates schematic, exploded views of dimensions of sealing members relative to existing pipes.

The lower and upper housing portions 30 and 40 are configured to receive a plurality of sealing members 50 to form a fluid seal between the lower and upper housing portions 30 and 40 and the exterior surface of the pipe 10, as shown in FIGS. 1A-2 and described further in FIG. 3. In one example, the sealing members 50 are in the form of gaskets 50. First and second gasket pairings may be used, and are positioned to encircle the pipe 10 on opposing sides of a slit 12 formed in the pipe 10, as shown in FIG. 2. In other words, a plurality of sealing members 50 contact the existing pipe 10 about at least two outer circumferences of the existing pipe 10 at locations spaced apart in the longitudinal direction L (see FIG. 4) of the existing pipe 10 to enclose a part of the existing pipe 10 in an airtight state.

Referring to FIG. 3, a single pair of lower and upper housing portions 30 and 40, together with various pairs of sealing members 50, are designed to work in conjunction with pipes 10a-10c of different outer diameters. In FIG. 3, a first pipe 10a has a smaller outer diameter than a second pipe 10b, which in turn has a smaller outer diameter than a third pipe 10c. Advantageously, the same pair of lower and upper housing portions 30 and 40 may be used on any of the first, second and third pipes 10a-10c, i.e., irrespective of their outer diameters, which provides significant advantages because a user does not need to know the exact outer diameter in advance of excavation of the pipes. In other words, a user may learn of the outer diameter of the pipe on site and promptly use the same pair of lower and upper housing portions 30 and 40, while simply selecting the appropriate sealing members.

In FIG. 3, sealing members in the form of a first gasket set having gaskets 50a and 50b are provided and designed for use with the first pipe 10a of the smallest outer diameter. The gaskets 50a and 50b each comprise a main body 51 having end regions 52 and 53 that extend laterally away from the pipe 10a, and further have an outer surface 54 having a generally concave shape relative to the pipe 10a. At least a portion of the outer surface 54 and the end regions 52 and 53 of the gasket 50a are dimensioned to fit inside of a gasket channel 37 in the lower housing portion 30. The gasket 50b is similarly dimensioned and fits inside of a gasket channel 47 in the upper housing portion 40.

The gaskets 50a and 50b each comprise a curved recess 55 formed into the main body at a location spaced apart from the outer surface 54, as shown in FIG. 3. An inner diameter $d_1$ varies amongst the gaskets 50a and 50b, 50a' and 50b', and 50a" and 50b". Specifically, the inner diameter $d_1$ of the gaskets 50*a* and 50*b* is less than the inner diameter of the gaskets 50*a*' and 50*b*', and the inner diameter of the gaskets 50*a*' and 50*b*' is in turn less than the inner diameter of the gaskets 50*a*" and 50*b*". As the inner diameter $d_1$ of the gaskets becomes larger, the curved recess 55 is pushed further outward, thus reducing the thickness of the main body 51 between the curved recess 55 and the outer surface 54. Thus, the main body 51 of gaskets 50*a* and 50*b* has the greatest thickness as determined between the curved recess 55 and the outer surface 54, while the main body 51' of gaskets 50*a*' and 50*b*' has an intermediate thickness as determined between the curved recess 55' and the outer surface 54, and the main body 51" of gaskets 50*a*" and 50*b*" has the smallest thickness as determined between the curved recess 55" and the outer surface 54, as shown in FIG. 3.

In this manner, the inner diameter $d_1$ of the gaskets 50*a* and 50*b* allows a secure fit around the pipe 10*a* having the smaller outer diameter, the inner diameter of the gaskets 50*a*' and 50*b*' allows a secure fit around the pipe 10*b* having an intermediate outer diameter, and the inner diameter of the gaskets 50*a*" and 50*b*" allows a secure fit around the pipe 10*c* having the largest outer diameter.

Notably, an outer diameter $d_2$ stays the same for each gasket 50*a*, 50*b*, 50*a*', 50*b*', 50*a*" and 50*b*". Accordingly, all of the gaskets 50*a*, 50*b*, 50*a*', 50*b*', 50*a*" and 50*b*" fit in the gasket recesses 37 and 47 of the lower and upper housing portions 30 and 40, respectively. Advantageously, all of the different seals shown may be used with the same pair of lower and upper housing portions 30 and 40.

In one exemplary system, a kit is provided to a user that comprises the lower and upper housing portions 30 and 40, along with a plurality of gasket pairs of different sizes. A user preferably knows the inner diameter of the pipe, but does not need to know the wall thickness of the pipe or the exact outer diameter of the pipe in advance of excavation of the pipes. When a user learns of the outer diameter of the pipe on site, the user may select and use the proper gasket pairing that fits the particular outer diameter of the pipe, as shown in FIG. 3.

In one example, where a pipe 10 has an inner diameter of 4 inches, the outer diameters of the pipes 10*a*-10*c* may vary between 4.5 inches and 5.6 inches, depending on the thickness of the pipe. Only one pair of upper and lower housing portions 30 and 40 is needed for the pipes 10*a*-10*c* having the inner diameter of 4 inches, regardless of the variations in wall thickness, because the plurality of gasket pairs of different sizes 50*a*, 50*b*, 50*a*', 50*b*', 50*a*" and 50*b*" can compensate for the different outer diameters ranging between 4.5 inches and 5.6 inches. In further examples, progressively larger pairs of lower and upper housing portions 30 and 40 may be provided for applications where alternative pipes comprise inner diameters with dimensions of 6, 8, 10 and 12 inches. Even if these alternative pipes comprise variable outer diameters based on their wall thicknesses, the plurality of gasket pairs of different sizes provided can compensate for such variation. It should be noted that while exemplary pipe dimensions are provided, the systems and methods described herein may be used in conjunction with an array of pipes of different dimensions.

Figure 4:
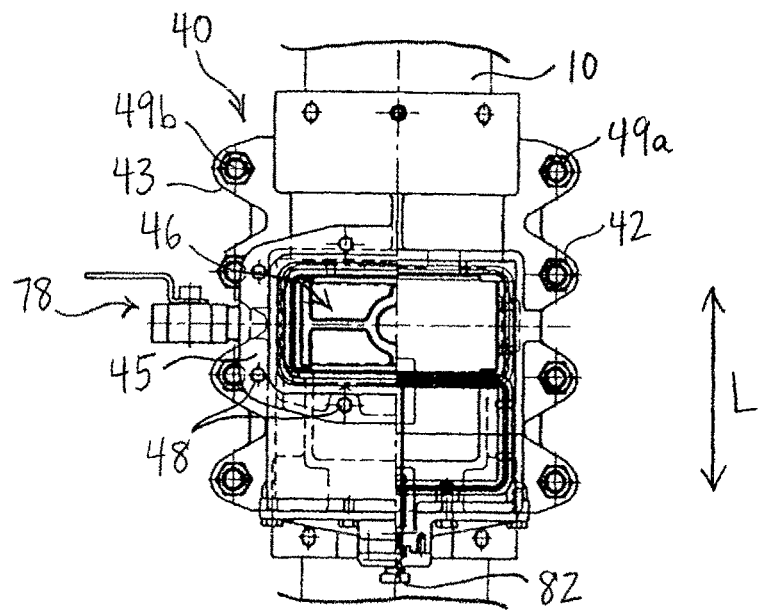
FIG. 4 is a top view, partially cut-away, illustrating features of an upper housing portion of the sealing housing of FIGS. 1-2.

Referring back to FIGS. 1A-2, in conjunction with FIGS. 4-5, further features of the upper housing portion 40 are shown and described. The upper housing portion 40 comprises a main body 41 that is adapted to encircle a portion of the pipe 10, an upper surface 45, and an integral valve housing section 44 disposed generally therebetween. The integral valve housing section 44 is elevated relative to the pipe 10, and is designed to accommodate an integral valve assembly 80 positioned therein, as explained further below.

As seen in FIG. 4, the upper surface 45 of the upper housing portion 40 comprises an opening 46 formed therein. The opening 46 comprises a generally rectangular shape, which in this embodiment, has a shorter length along the longitudinal axis L of the pipe 10 relative to its width as measured laterally across the pipe. The upper surface 45 comprises a plurality of bores 48 disposed around the perimeter of the opening 46, which permit a plurality of components to be coupled to the upper surface 45 of the upper housing portion 40. In particular, each of a valve bonnet 170, an adapter plate 140 for a cutting machine 150, and a blind flange 190 may be selectively coupled to the upper surface 45 of the upper housing portion 40, via the bores 48, at a position overlapping the opening 46, as explained in further detail below.

Figure 5A:
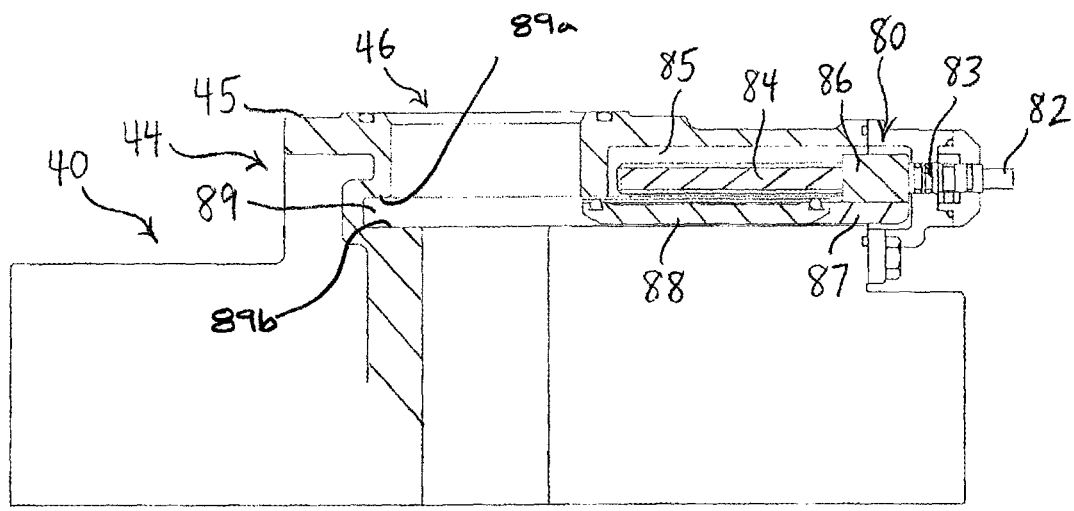
FIGS. 5A-5B are side-sectional views illustrating movement of a valve of an integral valve assembly between open and closed positions, respectively.
Figure 5B:
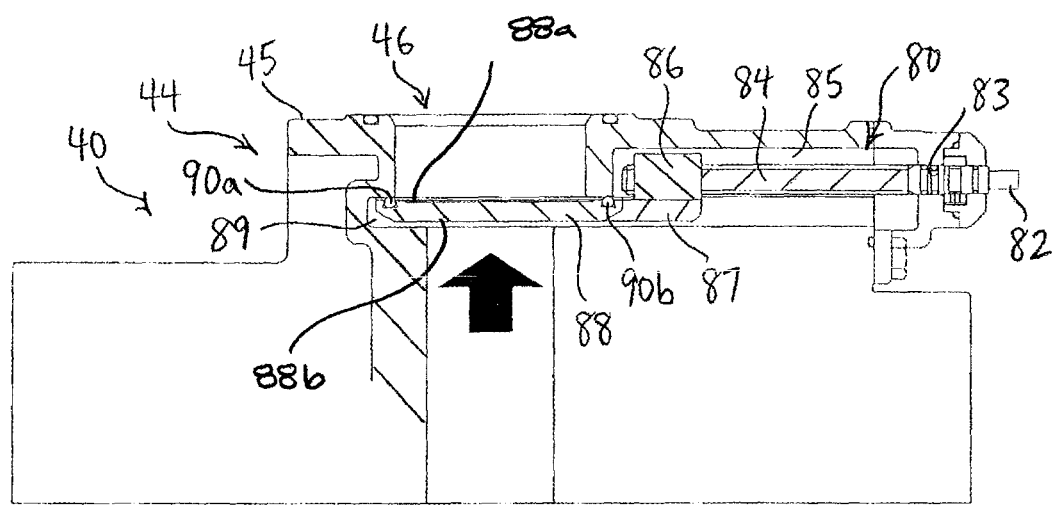

Referring to FIGS. 5A-5B, further features of the integral valve housing section 44, together with the integral valve assembly 80, are shown in a schematic representation of operation. The integral valve assembly 80 comprises a valve 88, which is configured for axial movement along the longitudinal axis L of the pipe 10. In one embodiment, the valve 88 comprises a generally flat rectangular-shaped plate member, however, alternative shapes such as circular and elliptical valves, as well as non-flat valves, may be used without departing from the spirit of the present embodiments. The valve may be circumscribed by edges, bevels, fillets, or may feature one or more ramps.

The valve 88 of the integral valve assembly 80 is movable between an open position in which the valve 88 provides an open pathway through the opening 46, as shown in FIG. 5A, and a closed position in which the valve 88 provides a seal adjacent to the opening 46, as shown in FIG. 5B. An actuation assembly is provided to move the valve 88 between the open and closed positions. In one example, the actuation assembly comprises a linear actuator that, when driven by a non-linear motion, creates linear motion. For example, rotation of a feed screw 82 that is accessible to a user outside of the first housing portion 40 may impart a linear motion to the valve 88 via linking elements 83.

In one example of a linear actuator, rotation of the feed screw 82 in a first direction linearly advances a block member 86 along a guide member 84, which is disposed within a slotted section 85 of the upper housing portion 40. The block member 86 is coupled to the valve 88 by a linkage 87, which may be integral with the valve and/or block member 86, or externally coupled thereto. As the feed screw 82 is rotated in the first direction, block member 86 is advanced in a direction from close proximity to the feed screw 82 towards the opening 46, thereby linearly advancing the valve 88 within a slot 89 until the valve 88 is disposed immediately beneath the opening 46 and spanning the entire surface area of the opening 46, as shown in FIG. 5B. In this closed position, an upper surface 88*a* of the valve 88 interfaces with an upper surface 89*a* of the slot 89, and a lower surface 88*b* of the valve 88 interfaces with a lower face 89*b* of the slot 89. When the interface between the valve 88 and the slot 89 is sufficiently snug, the system provides an effective seal, inhibiting fluid flow in a direction from the slit 12 in the pipe 10 upwards towards the opening 46. To further inhibit fluid flow, sealing members 90*a* and 90*b* may be coupled to the valve 88, such as the upper surface 88*a* as shown in FIG. 5B. Although not shown in the illustrated embodiments, sealing members may additionally or alternatively be coupled to the lower surface 88*b* of the valve 88, or the upper surface 89*a* or lower surface 89*b* of the slot 89.

Conversely, rotation of the feed screw 82 in a second, opposing direction linearly retracts the block member 86 along the guide member 84 in a direction from the opening 46 towards the feed screw 82. The valve 88 may be moved in this linear direction until it reaches the open position shown in FIG. 5A.

Referring now to FIGS. 6A-6F, additional components and selected exemplary method steps are explained in connection with certain functions of the assembly of the present embodiments. It should be noted that the pipe 10 may be part of a distribution system for water, oil, gas, and the like. The pipe 10 may be subterraneously positioned to protect it from damage. In order to access the pipe 10 and perform the functions herein, the pipe 10 must be exposed via a sufficiently sized excavation into the ground. The excavation may be accomplished by any suitable technique, and a clearance as low as 13 inches is required to perform the installation of the sealing housing 20 described herein. Once the pipe 10 is exposed, it is cleaned in order to remove any dirt on the pipe.

In preliminary steps, tape may be applied around the pipe 10 at locations corresponding to placement of the sealing members 50 described in FIGS. 1-3 above. The sealing members 50 and the tape around the pipe 10 then may be coated with a lubricant that will facilitate rotational movement of the lower and upper housing portions 30 and 40 with respect to the pipe 10 during the cutting operation noted in FIGS. 6C-6D below.

In next steps, the sealing housing 20 is installed around the pipe 10, with the sealing members 50a and 50b being disposed in the gasket channels 37 and 47 of the lower and upper housing portions 30 and 40, respectively. A first set of sealing members 50a and 50b is provided around the circumference of the pipe 10 at a first axial location, and a second set of sealing members 50a and 50b are provided around the circumference of the pipe 10 at a second axial location that is spaced apart in the longitudinal direction relative to the first axial location.

The coupling regions 32, 33, 42 and 43 of the lower and upper housing portions 30 and 40 are secured together, e.g., using the nut and bolt assemblies 49a and 49b described in FIG. 1A. At this time, the lower and upper housing portions 30 and 40 are secured to one another around the perimeter of the pipe 10, with the sealing members 50 in contact around the perimeter of the pipe 10 along at least two spaced-apart axial locations.

In a next step, a rotary feed drive unit (not shown) may be installed around the pipe 10 adjacent to the sealing housing 20, on the side of the sealing housing 20 that does not have the feed screw 82 projecting outward therefrom. The rotary feed drive unit may be used to actuate the cutting machine 150 of FIGS. 6A-6F, as explained further below.

In a further step, a workman ensures that the sealing housing 20 is mounted level with respect to the pipe 10. In particular, the upper surface 45 of the upper housing portion 40 should be facing directly upward. A diagnostic tool, such as a level, may be placed atop the upper surface 45 of the upper housing portion 40 to ensure it is in a level position before the cutting operation is performed.

Referring to FIG. 6A, after the preliminary steps outlined above are performed to secure the sealing housing 20 around the pipe 10 in a level manner, a travel limiter end ring 100 is secured around the pipe 10 adjacent to the sealing housing 20, on the side of the sealing housing 20 that has the feed screw 82 projecting outward therefrom. The travel limiter end ring 100 has lower and upper portions 101 and 111, respectively. The lower portion 101 of the travel limiter end ring 100 has coupling regions 102 and 103, while the upper portion 111 has coupling regions 112 and 113, as shown in FIG. 6A. When placed around the pipe 10, the coupling regions 102, 103, 112 and 113 are then coupled together, e.g., using nut and bolt assemblies, thereby securing the lower and upper portions 101 and 111 of the travel limiter end ring 100 around the pipe 10, as shown in FIG. 6A.

The upper portion 111 of the travel limiter end ring 100 comprises a main body 114 having a notched region 115 for receipt of a U-gage 130, as explained further below, and further comprises first and second end stops 116 and 118, respectively. The notched region 115 forms an indentation relative to the main body 114, while the first and second end stops 116 and 118 protrude radially outward relative to the main body 114, as shown in FIG. 6A. An inner surface 117 of the first end stop 116 is positioned 120 degrees apart from an inner surface 119 of the second end stop 118, as depicted in FIG. 6A, thereby allowing for a precise 120 degree cut into the pipe as explained in FIGS. 6C-6D below.

It should be noted that, in the embodiment depicted in FIGS. 6A-6F, the main body 114, the notched region 115 and the first and second end stops 116 and 117 are formed from a plate of material that is externally coupled to the upper portion 111 of the travel limiter end ring 100. Alternatively, the main body 114, the notched region 115 and the first and second end stops 116 and 117 may be integrally formed with the upper portion 111 of the travel limiter end ring 100.

In one embodiment, a travel indicator pin 120 may be coupled to the feed screw 82 of the valve assembly 80, as depicted in FIG. 6A. As noted above, the feed screw 82 is accessible to a user outside of the first housing portion 40, and is positioned in a direction facing the travel limiter end ring 100. The travel indicator pin 120 may be coupled to an exterior surface of the feed screw 82 in any suitable manner, including but not limited to using integral screws or pins, or using a threaded engagement. In effect, the travel indicator pin 120 provides an axial and/or radial extension of the feed screw after the travel limiter end ring 100 is secured to the pipe 10 adjacent to the sealing housing 20.

Referring to FIG. 6B, the U-gage 130 is used for further alignment purposes. Advantageously, the U-gage 130 centers the travel indicator pin 120 with respect to the notched region 115 as shown in FIG. 6B, thereby assuring that the slit 12 formed in the pipe 10 during the cutting step of FIGS. 6C-6D will be aligned with the gate 180 in the valve bonnet 170 when the valve bonnet 170 is coupled to the upper housing portion 40, as explained further below.

A chip flush fitting and valve 78 is installed into a tapped hole formed in the upper housing portion 40, as depicted in FIG. 6A. The chip flush fitting and valve 78 removes the chips created by the end mill cutting process described in FIGS. 6C-6D below. It should be noted that the chip flush fitting and valve 78 may be provided on either side of the upper housing portion 40, and is shown on a different side of the upper housing portion 40 in FIGS. 6A-6F, as compared to FIGS. 1A-B and 4, for illustrative purposes.

A cutting adapter plate 140 is mounted to the plurality of bores 48, seen in FIG. 4, that are disposed around the perimeter of the opening 46 in the upper surface 45 of the upper housing portion 40. The cutting adapter plate 140 comprises a bore that overlays the opening 46 of the upper housing portion 40. The cutting adapter plate also comprises a receiving portion 142 for securely engaging a cutting machine 150. Prior to mounting the cutting machine 150 to the receiving portion 142 of the cutting adapter plate 140, the unit may be filled with water for hydrostatic pressure testing. After the cutting machine 150 is attached, hydrostatic pressure testing may be performed at about 1.5 times the system operating pressure.

Exemplary cutting machines and related tools are shown in U.S. Pat. No. 6,470,907, which is hereby incorporated by reference in its entirety. In one presently preferred example, the cutting machine 150 may comprise a replaceable carbide cutting head.

Referring to FIG. 6C, after successful hydrostatic pressure testing, the sealing housing 20 with the cutting machine 150 coupled thereto is rotated until the travel indicator pin 120 touches the inner surface 119 of the second end stop 118 of the travel limiter end ring 100. The cutting head of the cutting machine 150 is advanced until it makes contact with an outside surface of the pipe 10, and then is advanced into and through the pipe 10. Measurement indicia may be used to determine a proper depth of insertion of the cutting head into the pipe.

Referring to FIG. 6D, the seal housing 20 with the cutting machine 150 attached then are rotated in tandem until the travel indicator pin 120 has moved from the inner surface 119 of the second end stop 118 of the travel limiter end ring 100, along the main body 114, and to the inner surface 117 of the first end stop 116, as depicted in FIG. 6D. As noted above, a rotary feed drive unit installed around the pipe 10 adjacent to the assembly 20, on the side of the sealing housing 20 that does not have the feed screw 82 projecting outward therefrom, may be used to actuate the cutting machine 150 using hydraulic, pneumatic or electric motor drives.

Advantageously, the first and second end stops 116 and 118 ensure that the slit 12 formed in the pipe 10 is precisely 120 degrees across the upper surface of the pipe, as illustrated from a cross-sectional view shown in FIG. 7A below. In one example, a 1.625 inch width slit is milled into the pipe, and such a thin slit coupled with a 120 degree cut across the top of the pipe helps maintain pipeline integrity. While a 120 degree cut is explained for discussion purposes, the cut may be greater or less than 120 degrees.

It is possible to remove chips during the cutting process via the chip flush fitting and valve 78. For example, as described in U.S. Pat. No. 6,283,446, which is hereby incorporated by reference in its entirety, apparatus and methods are described that discharge chips as a result of cutting the wall of the pipe from an outlet port together with the water flowing through the outlet port under pressure.

Referring to FIG. 6E, after the travel indicator pin 120 completes its path, the cutting head is retracted, and the sealing housing 20 with the cutting machine 150 coupled thereto are rotated in tandem back to a level position. The U-gage 130 is then used again to ensure that the level position of the sealing housing 20 is achieved, as shown in FIG. 6F.

In a next step, the valve 88 of the integral valve assembly 80 then is moved between the open and closed positions shown in FIGS. 5A and 5B, respectively. In particular, the feed screw 82 is rotated to impart a linear motion to the valve 88, as explained above. Optionally, the travel indicator pin 120 may still be attached to the feed screw 82 during the actuation of the valve 88, and therefore the travel indicator pin 120 may be rotated by the workman to effect rotation of the feed screw 82.

In the closed position of FIG. 5B, the valve 88 inhibits flow through the opening 46 in the upper surface 45 of the sealing housing 20, as described above. Thus, fluid from the pipe 10, which may escape via the slit 12 formed in the upper surface of the pipe 10, cannot escape from the sealing housing 20 due to the valve 88 being in the closed position. Sealing members may be coupled to the valve 88 or slot 89 to help ensure an enhanced seal.

In a next step, with the valve 88 of the integral valve assembly 80 in the closed position, the cutting machine 150 then is removed from engagement with the receiving portion 142 of the cutting adapter plate 140. Subsequently, the cutting adapter plate 140 is removed from engagement with the upper surface 45 of the upper housing portion 40 of the sealing housing 20.

Figure 7A:
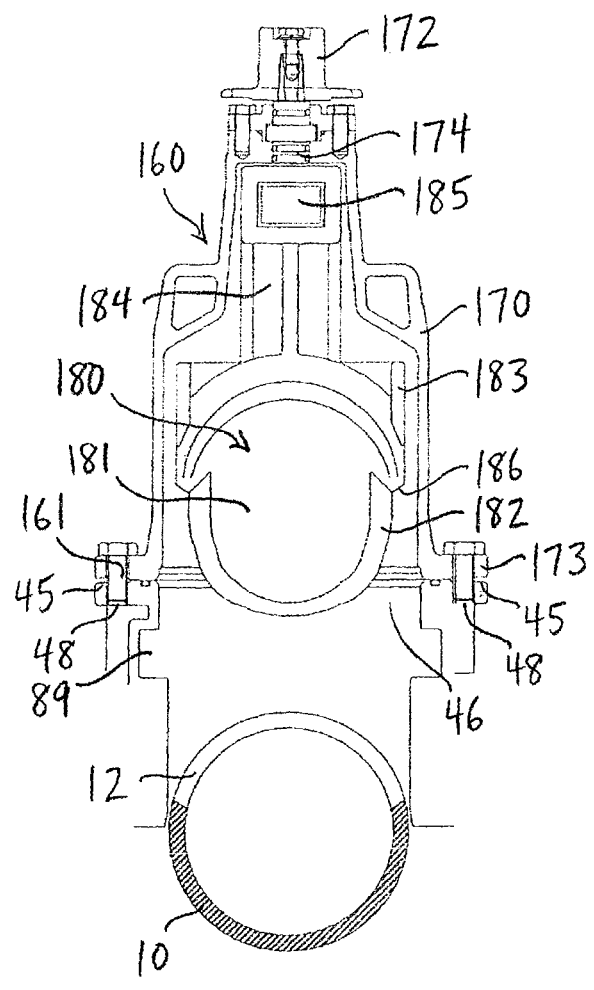
FIGS. 7A-7B are cross-sectional and side-sectional views, respectively, illustrating a sealing housing coupled to an existing pipe, and a valve bonnet coupled to the sealing housing, with a gate in an open position.
Figure 7B:
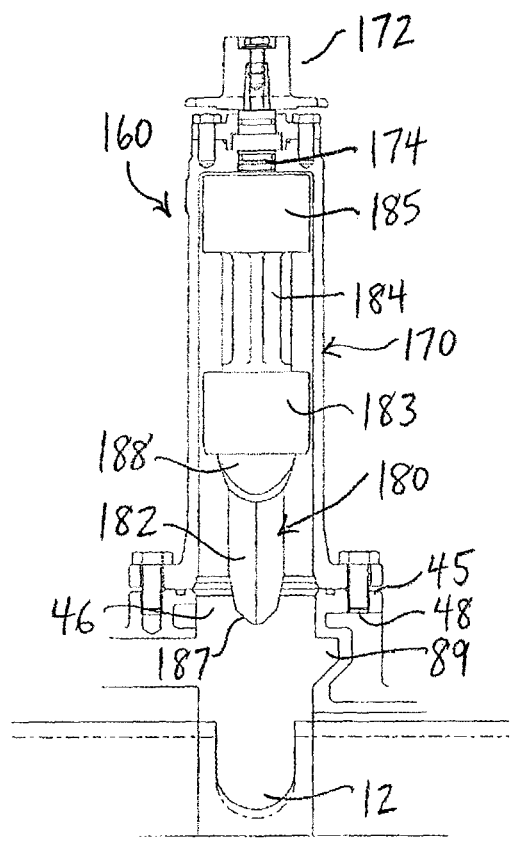
Figure 11A:
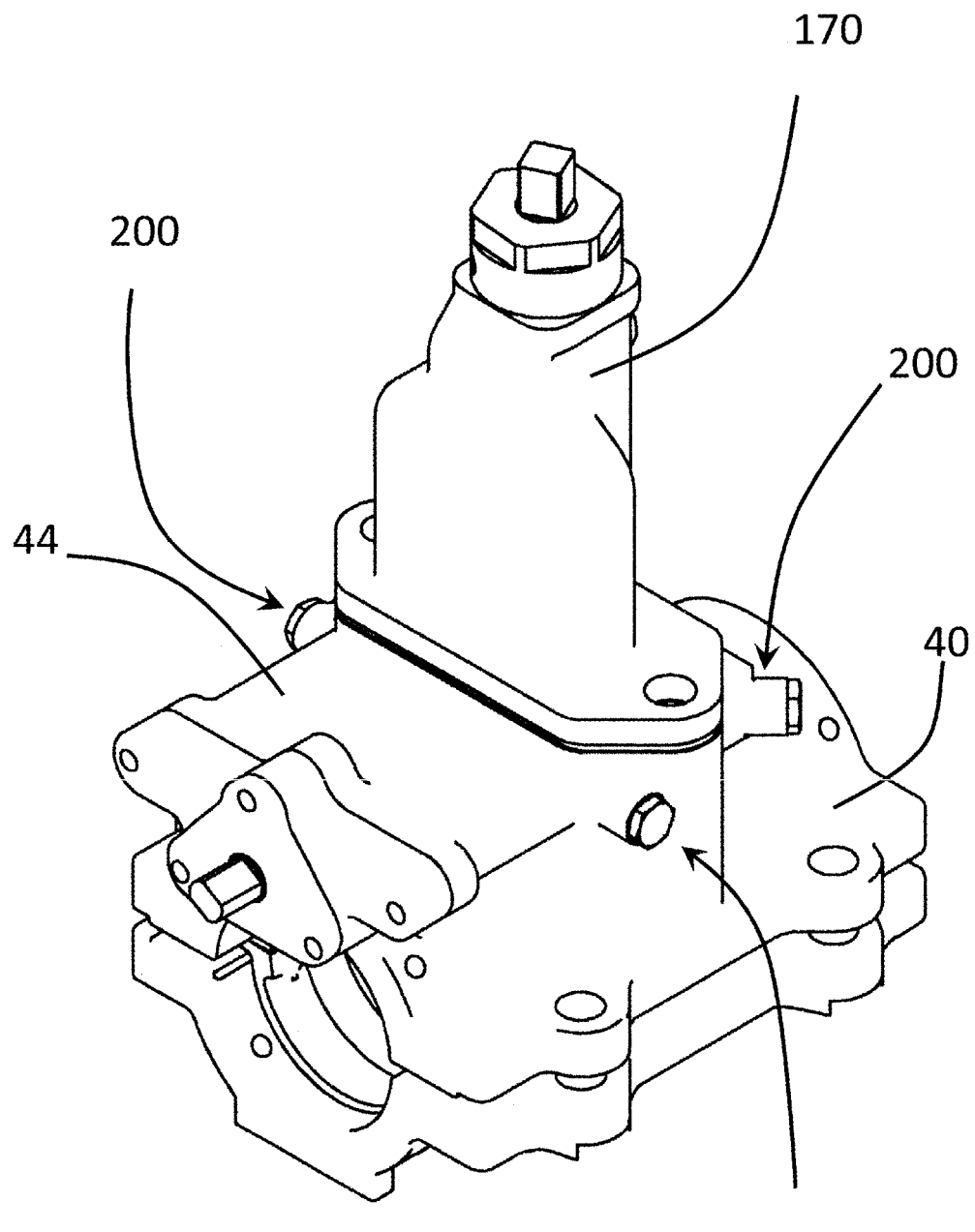
FIGS. 11A-11C are isometric, side, and front views, respectively, of a system including an integral valve assembly and biasing members.
Figure 11B:
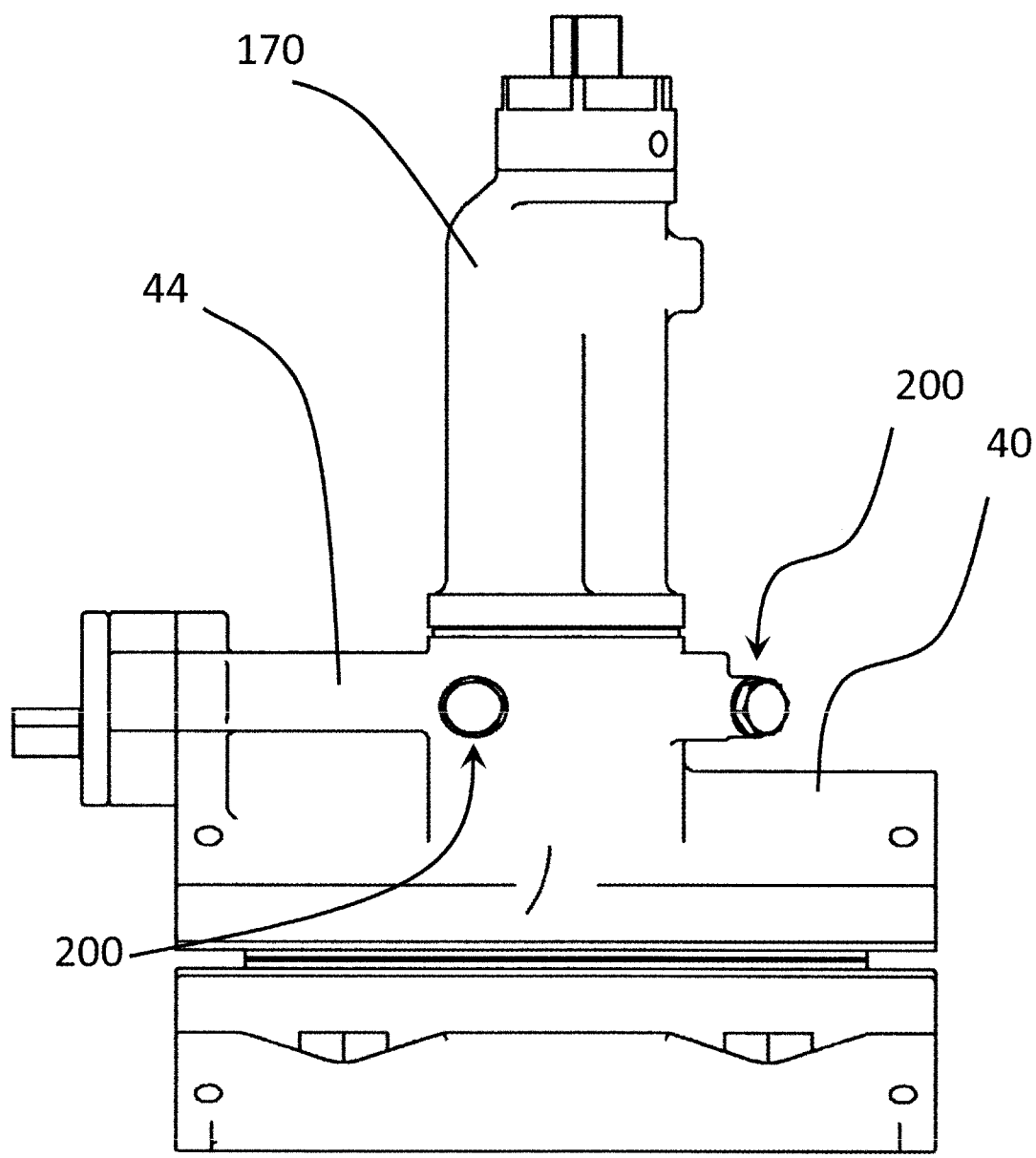
Figure 11C:
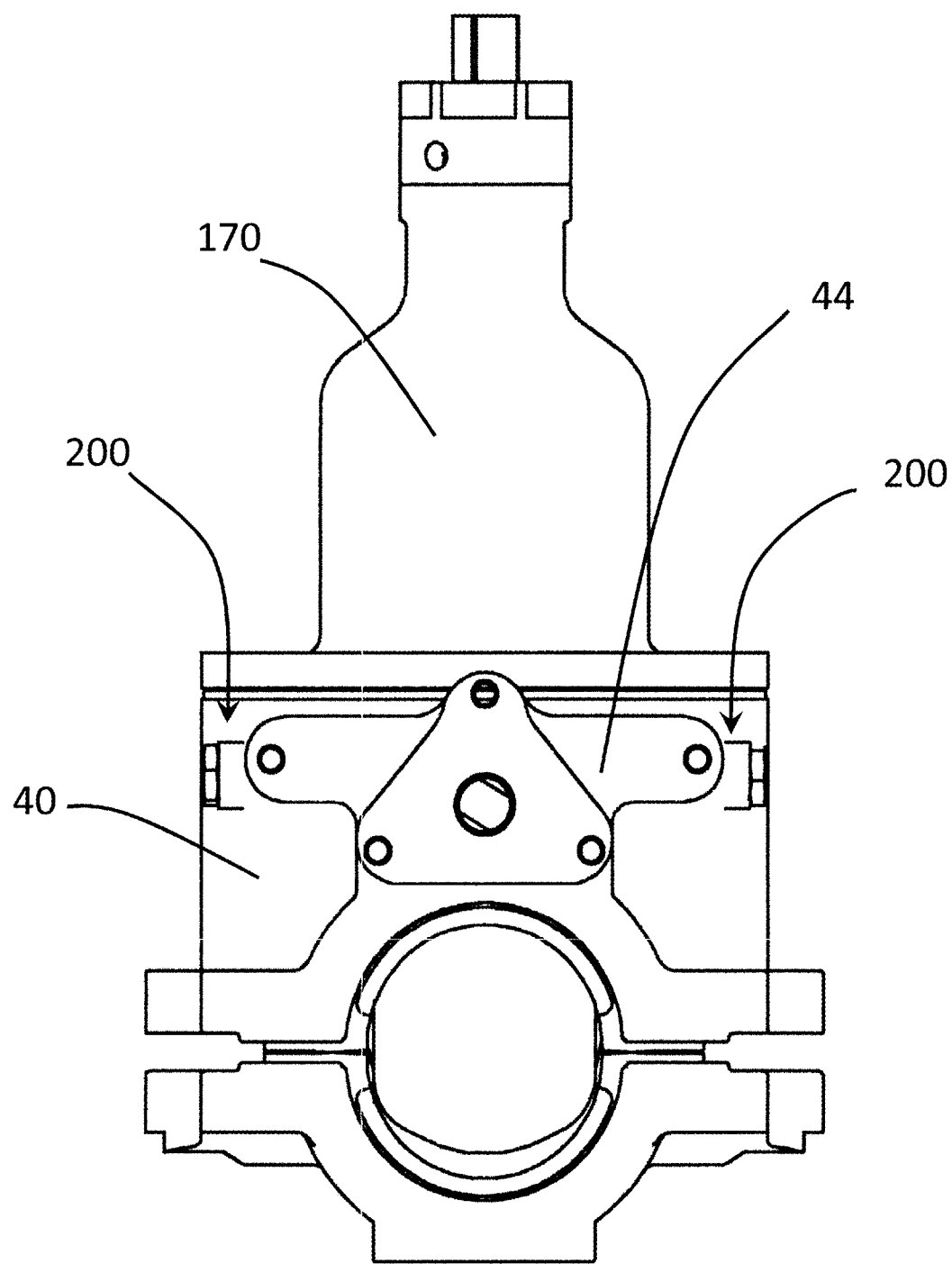

Referring now to FIGS. 7-8, together with FIGS. 1A-2 above, a valve assembly 160 having a valve bonnet 170 and gate 180 may be mounted to the upper housing portion 40 of the sealing housing 20 after the steps of FIGS. 6A-6F are completed. In particular, the valve bonnet 170 may comprise a base portion 173 that has a plurality of bores that overlap with the plurality of bores 48 formed in the upper surface 45 of the upper housing portion 40, as depicted in FIGS. 7A-7B. The base portion 173 of the valve bonnet 170 may be fixed to the upper housing portion 40 by assembling bolts 161 that go through the plurality of bores 48.

Upon secure coupling of the valve bonnet 170 to the upper housing portion 40, the valve 88 of the integral valve assembly 80 is moved from the closed position of FIG. 5B to the open position of FIG. 5A via actuation of the feed screw 82, as explained in detail above. In FIGS. 7A-7B, the valve 88 is shown removed from its slot 89, such that the gate 180 is ready to be advanced through the opening 46 in the upper surface 45 of the upper housing portion 40.

The gate 180 is pre-housed within the valve bonnet 170, as shown in FIG. 7A. A valve spindle 174, coupled to an actuator 172, is adapted to slide the gate 180 in a direction that crosses the flow passage within the pipe 10 at right angles thereto. The gate 180 is moved in a downward direction, in the embodiment shown herein, if the valve actuator 172 is turned. The gate 180 invades the inside of the existing pipe 10 through the slit 12.

In a preferred series of method steps, the gate 180 is run about 67% of the way into the interior of the pipe 10, which is enough to hold the valve in place while any necessary final tightening procedures are performed. For example, it may be desirable to further tighten the nut and bolt assemblies 49a and 49b described in FIG. 1A, as necessary, to ensure proper final securement of the lower and upper housing portions 30 and 40 to one another around the perimeter of the pipe 10. In a next step, the rotary feed drive unit used to actuate the cutting machine may be removed from engagement around the exterior of the pipe 10. Similarly, the travel limiter end ring 100 of FIGS. 6A-6F is removed from engagement around the exterior of the pipe 10. In effect, only the sealing housing 20 is disposed in surrounding engagement with the exterior of the pipe 10. A plurality of restraint bolts 99, shown in FIGS. 1A-2 and 9-10, then are advanced through internal threading in both the lower and upper housing portions 30 and 30 to securely restrain the sealing housing 20 relative to the perimeter of the pipe 10. Subsequently, the actuator 172 is further actuated to cause the gate 100 to extend fully into the interior of the pipe 10 to seal off flow within the pipe 10, as shown in FIGS. 8A-8B. In a next step, the chip flush fitting and valve 78 may be removed from the tapped hole formed in the upper housing portion 40 and a sealing plug 193, shown in FIGS. 9-10 below, is inserted into the tapped hole.

While various preferred method steps have been described, it will be appreciated that the steps listed herein need not necessary be performed in the particular order listed above. Certain sequences of steps may be performed in different orders or modified without departing from the spirit of the present embodiments.

In one exemplary embodiment, the gate 180 comprises a ductile iron material plus a rubber packing exterior 182. Iron pellets may be formed in the gate 180 that expand the rubber packing exterior 182. When the rubber packing exterior 182 is brought into contact with the slit surface 12 and the inner circumferential surface of the pipe 10, fluid flowing in the existing pipe 10 is stopped. Expansion of the rubber packing exterior 182 helps achieve a solid seal regardless of tuberculation build up within the interior surface of the pipe 10. Exemplary techniques for expanding an outer surface of a gate to achieve an enhanced seal with interior surfaces of a pipe are described further in U.S. Pat. No. 6,283,446, which is hereby incorporated by reference in its entirety.

In the exemplary embodiment shown in FIGS. 7-8, the gate 180 comprises a main blocking segment 181, the rubber packing exterior 182 disposed around a portion of the perimeter of the main blocking segment 181, a stability segment 183 positioned laterally outward near the top of the main blocking segment 181, and another stability segment 185 spaced-apart from the stability segment 183 by a body portion 184. Further, the upper region of the main blocking segment 181 may comprise a taper 186, which is configured to snugly engage an exterior portion of the cut pipe when the gate is closed as shown in FIG. 8A. The gate 180 may further comprise a tapered end segment 187, which facilitates entry into the slit 12 of the pipe 10, and additionally may comprise a tapered segment 188 that facilitates a snug engagement with the cut pipe 10.

The gate 180 is provided within the valve bonnet 170 in a manner that provides enhances stability to the gate 180, particularly when the gate is positioned inside of the pipe 10 as shown in FIGS. 8A-8B. First, the gate 180 is stabilized when at least partially positioned within the slit 12 itself due to a frictional engagement therein. Second, the gate 180 is stabilized due to the stability segment 183 having a tight tolerance relative to the upper housing portion 40, as shown in FIG. 8B. Further, the stability segment 185 has a tight tolerance relative to an interior surface 177 of the valve bonnet 170, as shown in FIG. 8B. Additionally, the actuator 172 provides stability to the gate. By providing enhanced stability segments, the gate is less likely to deflect along the longitudinal axis L of the pipe 10, thereby enhancing sealing functionality within the pipe 10.

In accordance with another aspect, a user may leave the valve bonnet 170 with the gate 180 coupled to the sealing housing 20 for longer-term valve insertion, or alternatively, may use the valve bonnet 170 with the gate 180 for a temporary linestop and subsequently remove the valve bonnet 170. As can be seen in FIG. 9, the valve bonnet 170 remains coupled to the sealing housing 20 for longer-term valve insertion, and the gate 180 may be repeatedly opened and closed as many times as desired over a selected period of time or permanently.

However, in FIG. 10, if only a temporary linestop is needed or the user otherwise wishes to remove the valve bonnet 170, then in a first step the gate 180 is retracted within the confines of the valve bonnet 170, as shown in FIGS. 7A-7B. The valve 88 of the integral valve assembly 80 then is closed, as shown in FIG. 5B, via actuation of the feed screw 82, and with flow sealed off, the base portion 173 of the valve bonnet 170 is removed from engagement with the upper surface 45 of the upper housing portion 40. A blind flange 190 then may be secured to the bores 48 in the upper surface 45 of the upper housing portion 40. Advantageously, the user therefore may remove the valve bonnet 170 and use it for other procedures, thereby saving money, particularly when an otherwise short linestop is needed. But since the sealing housing 20 remains engaged to the pipe 10, the blind flange 190 may be replaced with the valve bonnet 170 once again, as needed.

Referring to FIGS. 11A-13, an alternative embodiment of a system for use with an existing pipe 10 is shown. The integral valve housing 44 communicates with the upper housing portion 40, and contains the integral valve assembly 80, which operates as described above. Notably, the illustrated embodiment features biasing members 200, which may cooperate as a biasing system 202. The number of biasing members 200 may increase or decrease for convenience, economy, or technical requirements of the particular application. When constructed and operated according to the structures and methods described below, each biasing member 200 may exert a force against the valve 88, creating a tight seal to inhibit fluid flow in a direction from the slit 12 in the pipe 10 upwards towards the opening 46.

As described above, the valve 88 generally is a flat, rectangular-shape plate member, but may alternatively be circular, elliptical, or other shape, as the application requires. The valve 88 has an upper surface 88a and a lower surface 88b, and the valve 88 may be circumscribed by edges, bevels, fillets, or may feature one or more ramps. The valve 88 resides within a slot 89, where it may move in the fore and aft directions towards and away from the opening 46. Slot 89 has an upper surface 89a and a lower surface 89b. The valve 88 may move between an open position in which it provides an open pathway through the opening 46 (as shown in FIG. 5A) and a closed position in which it provides a seal adjacent to the opening 46 (as shown in FIG. 5B). In the closed position, the valve 88 forms a seal against slot 89 by virtue of the snug interface between the upper surface 88a of the valve 88 and upper surface 89a of the slot 89, as shown in FIGS. 5A-5B. In alternative embodiments (not shown), the valve 88 may form a seal against slot 89 by virtue of the snug interface between the lower surface 88b of the valve 88 and lower surface 89b of the slot 89.

The illustrated embodiment features an array of biasing members 200, each of which may exert a biasing force against the valve 88. The biasing force exerted by the embodiments described below is function of user adjustment, although alternative embodiments may optionally employ springs, cams, or other structure to exert a constant biasing force, independent of user adjustment. All biasing members 200 of the array are visible in the bottom sectional view of FIG. 13. Evaluation of FIG. 13 in conjunction with FIG. 11A reveals that each biasing member 200 of the illustrated embodiment is positioned within the upper housing portion 40 at positions proximal to the opening 46. The biasing members 200 need not be immediately adjacent to the upper surface 45 of the upper housing portion 40; however, it may be advantageous to position the biasing members 200 proximal to the valve 88. In this example, each biasing member 200 may reside within a bore 204 that extends through the outer surface of the upper housing portion 40 and into the slot 89. While the bores 204 of the illustrated embodiment generally lie in a plane roughly parallel to the plane corresponding to the valve 88, this orientation is not necessary. Alternatively, the bores 204 may be oblique or perpendicular relative to the valve 88. The biasing members 200 and bores 204 may be at least partially offset from the valve 88, in order for the biasing force to act on the upper or lower surfaces 88a, 88b of the valve 88. For example, each biasing member 200 may be offset below the valve 88 in order to exert an upward biasing force on the lower surface 88b of the valve 88, so as to urge the valve 88 toward the upper surface 89a of the slot 89, where it may form a seal with the upper surface 88a of the valve 88. Alternatively, each biasing member 200 may be offset above the valve 88 in order to exert a downward biasing force on the upper surface 88a of the valve 88, so as to urge the valve 88 downward toward the lower surface 89b of the slot 89, where it may form a seal with the lower surface 88b of the valve 88.

Figure 12A:
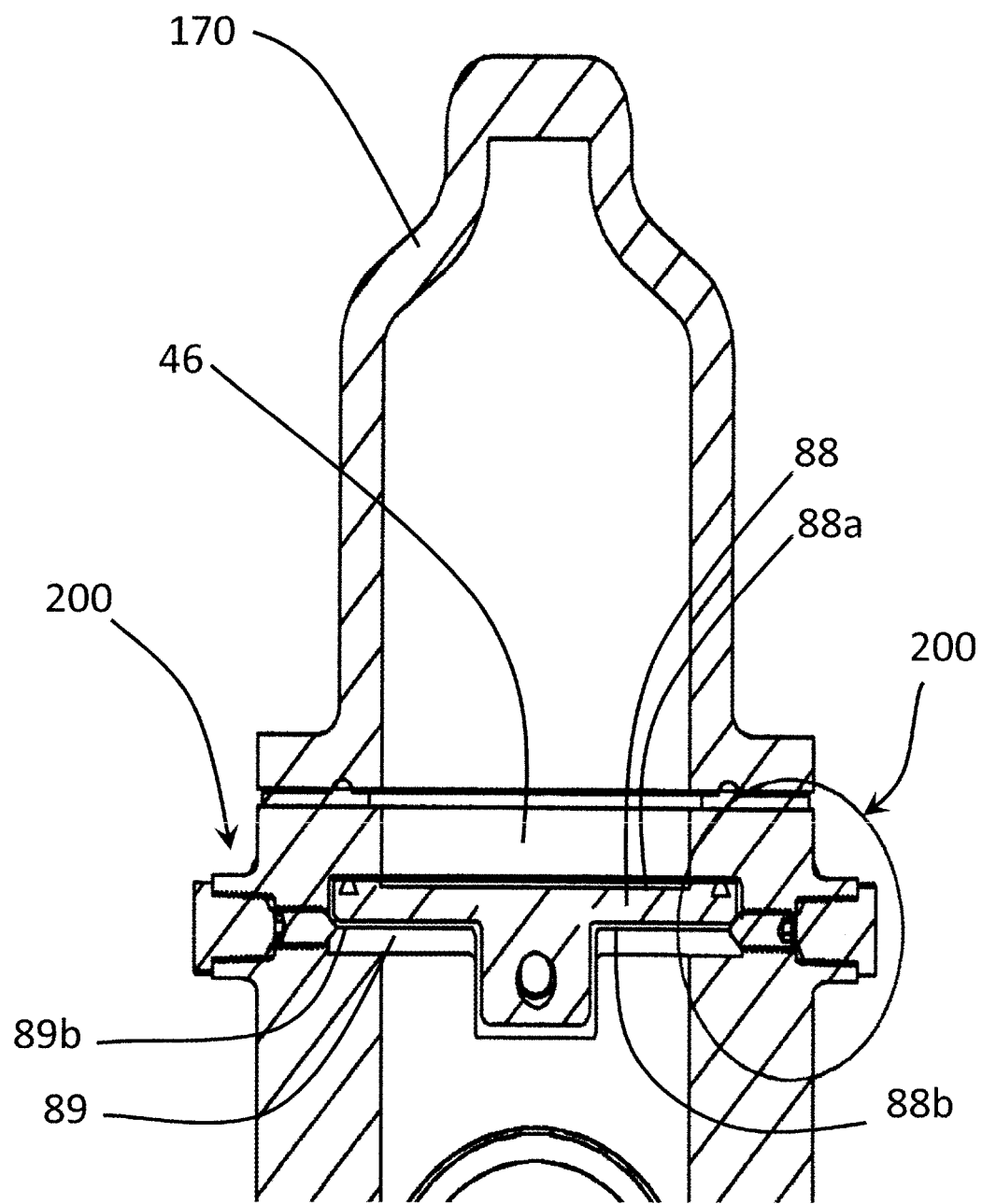
FIGS. 12A-12B are partial front sectional views of a system including an integral valve assembly and biasing members.
Figure 12B:
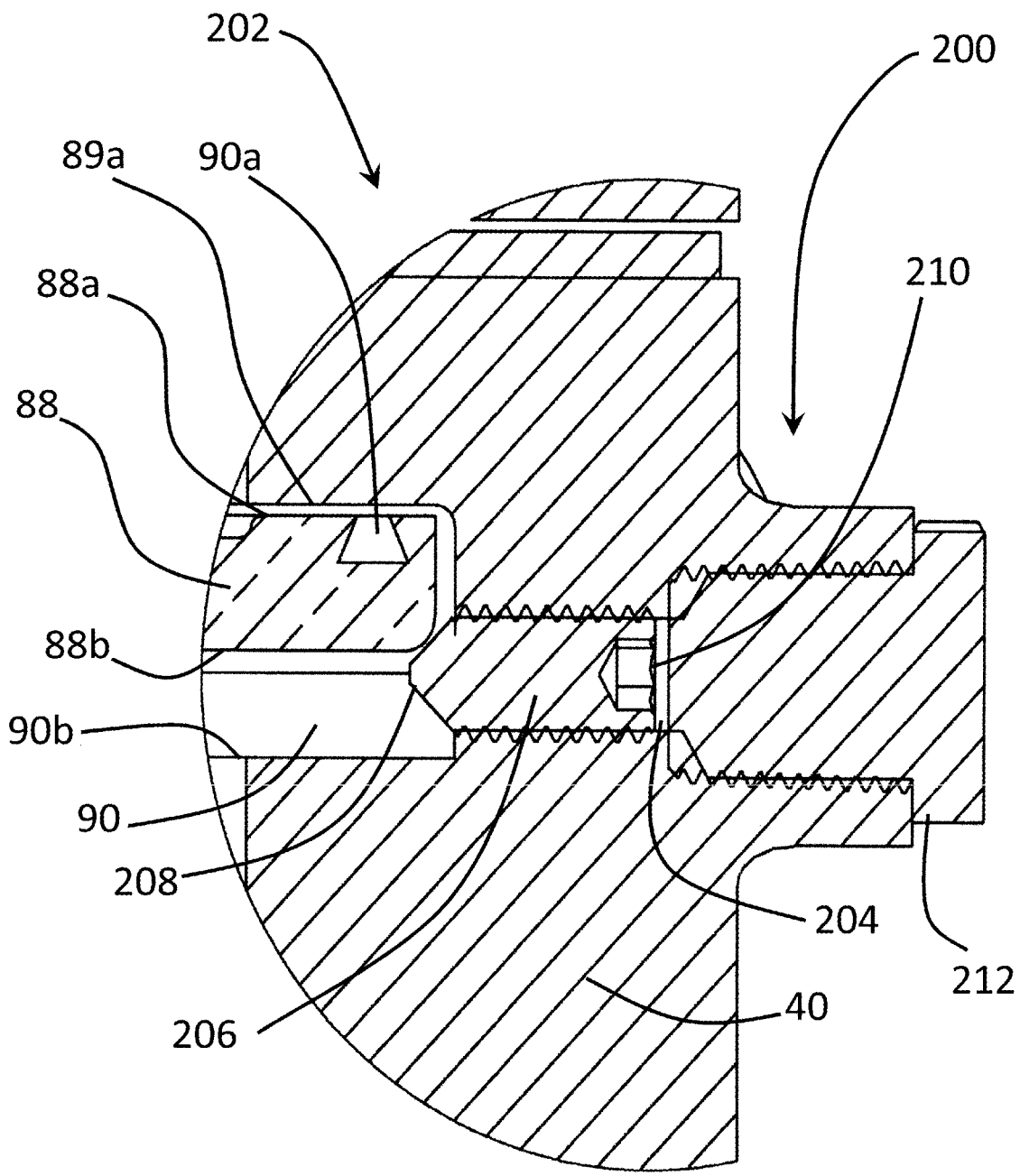
Figure 13:
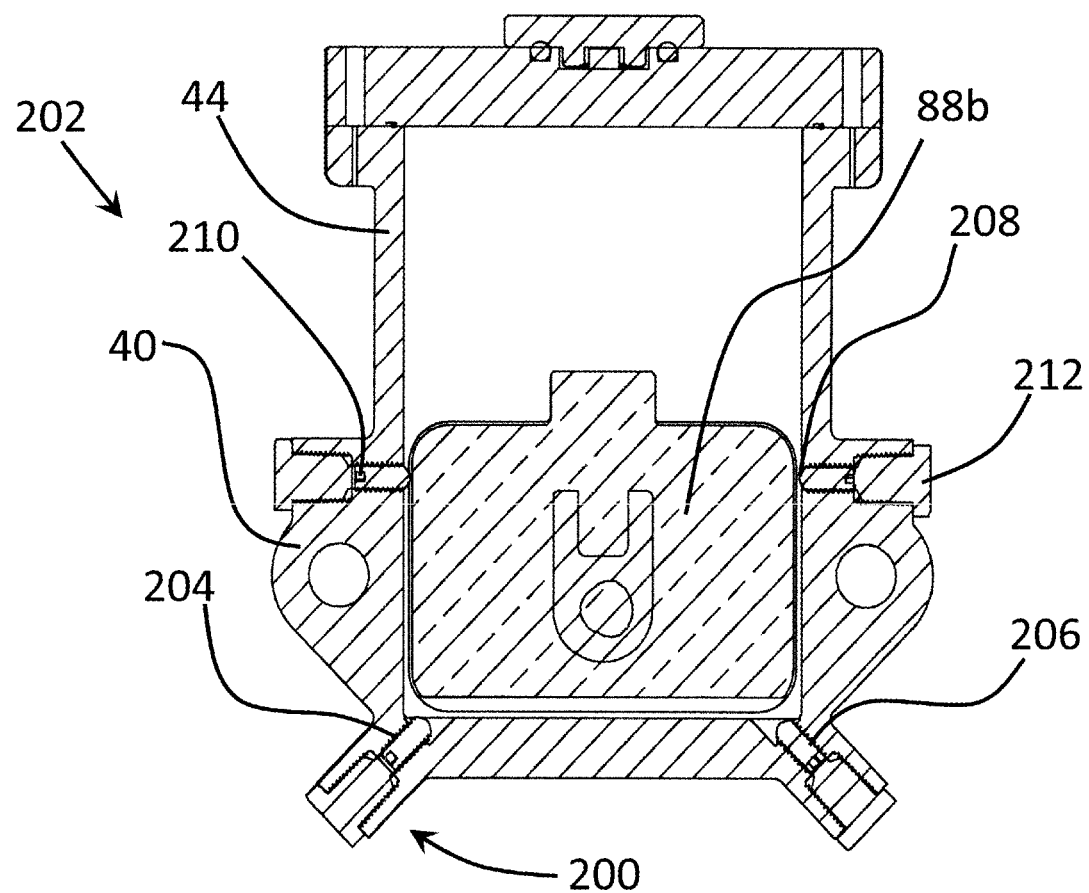
FIG. 13 is a bottom sectional view of a system including an integral valve assembly and biasing members, with the valve of the integral valve assembly in a closed position.

FIG. 12B depicts one embodiment of a biasing member 200 movably residing within a bore 204. In this embodiment, the biasing member 200 includes an elongate, cylindrical shank 206 separating a tip 208 from a distal end 210. In the illustrated embodiment, the biasing member 200 is a threaded cylinder movably residing within a threaded bore 204. As the biasing member 200 is rotated, it advances or retracts through the bore 204 via the threads. To facilitate moving the biasing member 200 through the bore 204, the distal end 210 of the biasing member may contain a recess, such as to receive a screwdriver, Allen wrench, or similar device, or it may feature a protrusion, such as a hexagonal head suitable to couple with a socket or other tool. The tip 208 is conical in the illustrated embodiment, although frustoconical, hemispherical, or other tapered shapes are also suitable. The tip 208 of the biasing member 200 may also be flat, especially if the biasing member 200 is oriented obliquely relative to the valve 88, or makes contact with a surface of the valve 88 that is channeled, beveled, filleted, ramped, or otherwise formed such that it makes contact with the biasing member 200 at an angle. The biasing member 200 may be formed of any single material or combination of suitable materials, including but not limited to stainless steel, carbon steel, other ferrous compositions, non-ferrous compositions such as brass, and polymers. To prevent pressurized fluid from escaping the system through the bores 204, a seal plug 212 may be used to close the bore 204.

In practice, with reference to the embodiment shown in FIGS. 11A-13, the valve 88 is advanced toward the closed position from the open position, for example by turning a feed screw 82 in order to urge the valve 88 through the slot 89 as described above. Optionally, until the valve 88 reaches the closed position, all biasing members 200 (if there are more than one) may be partially retracted through the bores 204 so that the biasing member tips 208 do not contact the valve 88 as it advances toward the closed position. After the valve 88 reaches the closed position or concurrently as the valve 88 advances toward the closed position, each biasing member 200 is moved through the biasing member bore 204, e.g., by rotating it clockwise if the bore 204 contains right-handed threads, until the biasing member tip 208 makes contact with the valve 88 (e.g., the lower surface 88b of the valve 88 as in FIGS. 11A-13, exerting a force against the valve 88). Given the tapered shape of the biasing member tip in the illustrated embodiment and orientation of the biasing member 200 in other embodiments, this force can be represented as two component forces: a horizontal component force and a vertical biasing force. In embodiments (such as that shown in FIGS. 11A-13) where the biasing member 200 makes contact with the lower surface 88b of the valve 88 (or a lower edge, channel, bevel, fillet, or ramp, or similar surface), the biasing force urges the valve 88 toward the upper surface 89a of the slot 89. In embodiments (not shown) where the biasing member 200 makes contact with the upper surface 88a of the valve 88 (or an upper edge, channel, bevel, fillet, ramp, or similar surface), the biasing force urges the valve 88 toward the lower surface 89b of the slot. In embodiments comprising an array of biasing members 200, the individual biasing forces exerted by each biasing member 200 operate upon the valve 88 as a biasing system. When the valve 88 is in the closed position, it spans the entire surface area of the opening 46; therefore, the biasing force acts to compress the valve 88 between the biasing member(s) 200 and upper surface 89a or lower surface 89b of the slot 89, depending upon the embodiment. Because each biasing member 200 may move within its bore 204, the biasing force exerted upon the valve 88 is adjustable by a user. In alternative embodiments (not shown), the biasing members may comprise one or more springs, cams, or other structure to exert a constant biasing force, independent of user input. With sufficient biasing force, the interface between the valve 88 and the slot 89 can form an effective seal, inhibiting fluid flow in a direction from the slit 12 in the pipe 10 upwards towards the opening 46. Although embodiments may feature an array of biasing members 200, the sealing effect between the valve 88 and slot 89 can be achieved by utilizing a single biasing member 200. In those embodiments comprising an array of biasing members 200, biasing members 200 may be positioned near each corner of the valve 88 (if valve 88 features corners) or near the center of one or more edges. The effect of such an orientation is to exert numerous biasing forces upon the valve 88 at positions that create an approximately even distribution of biasing force around the valve 88. To facilitate the even distribution of the biasing force, it may be advantageous to advance all biasing members 200 toward the valve 88 simultaneously. The sealing effect can be further improved by utilizing one or more sealing members (such as 90a and 90b shown in FIGS. 5A-5B) to seal the interface between the valve 88 and the slot 89, as described above. For example, the sealing members 90a and 90b may be adjoined to the upper surface 88a of the valve 88, e.g., adhesively or by insertion into a channel 214 formed around the upper surface 88a of the valve 88, such as a dovetail channel (as shown in FIG. 12B). Alternatively, sealing members (not shown) may be adjoined to lower surface 88b of the valve 88, or the housing 20 itself, e.g., within the slot 89.

When operated according to the methods described above, the disclosed embodiments and equivalents advantageously provide an enhanced seal between the valve 88 and the slot 89. This is particularly true in low pressure applications, such as where the pipe 10 contains a gas pressurized to a level between about 0.1-5.5 pounds per square inch (psi). In such embodiments, there may not be enough pressure from the gases below (i.e., force acting upward) to push the valve 88 upward to seat against the slot 89. Advantageously, the provision of the at least one biasing member facilitates enhanced sealing between the valve 88 and the upper surface 89a of the slot 89 to prevent gas from escaping when provided according to the present embodiments.

Furthermore, when the valve 88 is used in conjunction with components such as a cutting machine 150 (as disclosed herein), it may be particularly desirable to urge the valve 88 toward the upper surface 89a of the slot 89 in order to prevent chips created during the cutting operation from fouling the seal between the valve 88 and slot 89. If it becomes desirable or necessary for such reason to urge the valve 88 toward the upper surface 89a of the slot 89, and if the fluid pressure from below the valve is relatively low (e.g., due to the presence of gas in the line, as noted above), then advantageously the design and placement of the at least one biasing member as shown in FIGS. 11A-13 can specifically address each of these potential concerns relating to reducing cutting chip interference and potential gas leakage.

Further, the biasing members 200 advantageously prevent fluid from escaping through the opening 46 when the valve bonnet 170 is removed from the upper surface 45 of the upper housing portion 40, or when the cutting machine 150 is removed from engagement with the receiving portion 142 of the cutting adapter plate 140.

In such situations where the pipe 10 is pressurized to a pressure greater than the atmospheric pressure acting on the upper surface 88a of the valve 88, embodiments featuring at least one biasing member that urges the valve 88 toward the upper surface 89a of the slot 89 advantageously act in concert with the force exerted by the fluid on the valve 88 to provide an enhanced seal. On the other hand, in such situations where the pipe 10 is pressurized to a pressure less than the atmospheric pressure acting on the upper surface 88a of the valve 88, embodiments featuring at least one biasing member that urges the valve 88 toward the lower surface 89b of the slot 89 advantageously act in concert with the force exerted by the atmospheric pressure on the valve 88 to provide an enhanced seal. However, it will be appreciated that the present embodiments may be used in an opposite manner, e.g., where the pipe 10 is pressurized to a pressure greater than the atmospheric pressure acting on the upper surface 88a of the valve 88, the at least one biasing member may urge the valve 88 toward the lower surface of the slot, and where the pipe 10 is pressurized to a pressure less than the atmospheric pressure acting on the upper surface 88a of the valve 88, the at least one biasing member may urge the valve 88 toward the upper surface of the slot.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A valve assembly comprising:
a valve comprising an upper valve surface and a lower valve surface, the valve being movable in a slot in a housing between an open position and a closed position, the slot comprising an upper slot surface and a lower slot surface defined by the housing; and
a plurality of biasing members movably positioned within the housing and configured to be disposed outside a pipe and urge the valve toward one of the upper slot surface and the lower slot surface outside the pipe,
wherein the valve is configured to be disposed outside the pipe and be movable axially along a longitudinal axis of the pipe, and the valve is fully disposed inside the slot,
wherein each of the plurality of biasing members comprises a structure selected from the group consisting of a shank, a spring and a cam, and
wherein the plurality of biasing members are disposed on one same side of the pipe, and comprise at least four biasing members including a first biasing member positioned at a first corner of the valve, a second biasing member positioned at a second corner of the valve, a third biasing member positioned along a first edge of the valve, and a fourth biasing member positioned along a second edge of the valve.

2. The valve assembly of claim 1, wherein each of the plurality of biasing members is configured to contact the lower valve surface.

3. The valve assembly of claim 1, wherein each of the plurality of biasing members is configured to contact the upper valve surface.

4. The valve assembly of claim 1, wherein each of the plurality of biasing members is configured to urge the valve through direct contact with the valve.

5. The valve assembly of claim 1, wherein each of the plurality of biasing members has a tip having a shape that is one of a conical, a frustroconical, and a hemispherical shape.

6. The valve assembly of claim 1, wherein each of the plurality of biasing members is moveably positioned within a bore extending through an outer surface of the housing.

7. The valve assembly of claim 6, wherein the bore is oriented parallel to the valve.

8. The valve assembly of claim 6, wherein the bore is oriented obliquely to the valve.

9. The valve assembly of claim 6, wherein the bore is oriented perpendicularly to the valve.

10. The valve assembly of claim 6, further comprising a removable seal plug.

11. The valve assembly of claim 1, further comprising means for moving the valve from the open position to the closed position.

12. The valve assembly of claim 1, wherein the plurality of biasing members point toward the valve from different directions.

13. A biasing system, comprising:
a valve comprising an upper valve surface and a lower valve surface, the valve being movable between an open position and a closed position in a slot in a housing, the slot comprising an upper slot surface and a lower slot surface defined by the housing; and
a plurality of biasing members, each biasing member of the plurality of biasing members being movably positioned in the housing and configured to be disposed outside a pipe,
wherein the valve is configured to be disposed outside the pipe and be movable axially along a longitudinal axis of the pipe, and the valve is fully disposed inside the slot,
wherein the biasing member comprises a structure selected from the group consisting of a shank, a spring and a cam,
wherein the plurality of biasing members are disposed on one same side of the pipe, point toward the valve from different directions and are configured to inhibit fluid flow around the valve by urging the valve toward one of the upper slot surface and the lower slot surface outside the pipe.

14. The biasing system of claim 13 wherein each of the plurality of biasing members has a tip having a conical or a frustroconical shape.

15. The biasing system of claim 13, wherein the plurality of biasing members are configured to exert a biasing force on the valve.

16. The biasing system of claim 15, wherein the biasing force has an adjustable magnitude.

17. The biasing system of claim 15, wherein the plurality of biasing members are configured to exert the biasing force on the valve when the valve is in the closed position.

18. The biasing system of claim 15, wherein the plurality of biasing members are positioned around a perimeter of the valve.

19. A method for sealing a valve using the biasing system of claim 13, comprising:
attaching a component to the housing containing the valve that is moveable between 1) an open position in which the valve does not obstruct an opening and 2) a closed position in which the valve obstructs the opening;
inserting the component through the opening when the valve is in the open position;
retracting the component from the opening;
moving the valve to the closed position;
manipulating at least one of the plurality of biasing members to urge the valve toward the housing to facilitate inhibiting fluid flow through the opening; and
removing the component from the housing.

20. The method for sealing a valve of claim 19, wherein the component comprises one of a gate and a cutting machine.

\* \* \* \* \*